(12) United States Patent
Denda et al.

(10) Patent No.: US 12,185,888 B2
(45) Date of Patent: Jan. 7, 2025

(54) AUTONOMOUSLY TRAVELING VEHICLE, CONTROL METHOD, AND PROGRAM

(71) Applicant: MURATA MACHINERY, LTD., Kyoto (JP)

(72) Inventors: Yuki Denda, Kyoto (JP); Hideo Shitamoto, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 328 days.

(21) Appl. No.: 17/775,953

(22) PCT Filed: Sep. 18, 2020

(86) PCT No.: PCT/JP2020/035470
§ 371 (c)(1),
(2) Date: May 11, 2022

(87) PCT Pub. No.: WO2021/106331
PCT Pub. Date: Jun. 3, 2021

(65) Prior Publication Data
US 2022/0378268 A1    Dec. 1, 2022

(30) Foreign Application Priority Data

Nov. 25, 2019    (JP) .................................. 2019-212495

(51) Int. Cl.
*A47L 11/40*    (2006.01)
*G05D 1/00*    (2006.01)

(52) U.S. Cl.
CPC ........ *A47L 11/4011* (2013.01); *G05D 1/0217* (2013.01); *G05D 1/0219* (2013.01); *G05D 1/0274* (2013.01); *A47L 2201/04* (2013.01)

(58) Field of Classification Search
None
See application file for complete search history.

(56) References Cited

U.S. PATENT DOCUMENTS 4,700,427 A     10/1987   Knepper
5,204,814 A  *  4/1993    Noonan .............. B60L 15/2036
                                                                701/25
(Continued)

FOREIGN PATENT DOCUMENTS

JP        5043410 B2      10/2012
WO    2011/090093 A1      7/2011
WO    2018/043180 A1      3/2018

OTHER PUBLICATIONS

Official Communication issued in International Patent Application No. PCT/JP2020/035470, mailed on Nov. 10, 2020.
(Continued)

*Primary Examiner* — Jonathan M Dager
(74) *Attorney, Agent, or Firm* — Keating & Bennett, LLP

(57) ABSTRACT

An autonomously traveling vehicle includes a main body, a storage, an autonomous travel plan generator and a traveling controller. The main body includes a traveling carriage. The storage stores partial traveling route data generated for subareas including an individual coordinate system, and route connection data connecting the partial traveling routes. The autonomous travel plan generator generates an autonomous traveling schedule for autonomous travel by associating the selected partial traveling route data and the selected route connection data that connects the partial traveling routes. The traveling controller controls the traveling carriage in accordance with the autonomous traveling schedule to move the main body.

7 Claims, 37 Drawing Sheets

(56) References Cited

U.S. PATENT DOCUMENTS

| | | | |
|---|---|---|---|
| 8,666,550 B2* | 3/2014 | Anderson | A01D 34/008 700/255 |
| 9,258,942 B2* | 2/2016 | Biber | A01D 34/008 |
| 9,510,505 B2* | 12/2016 | Halloran | G05D 1/0236 |
| 9,804,594 B2* | 10/2017 | Gariepy | G05D 1/223 |
| 9,804,604 B2* | 10/2017 | Mattsson | A01G 25/16 |
| 9,888,625 B2* | 2/2018 | Yamamura | A01D 34/008 |
| 10,029,368 B2* | 7/2018 | Wolowelsky | G05D 1/0274 |
| 10,034,421 B2* | 7/2018 | Doughty | A01D 34/008 |
| 10,104,835 B2* | 10/2018 | K?hler | G05B 15/02 |
| 10,180,328 B2* | 1/2019 | Matthews | G05D 1/0291 |
| 10,188,029 B1* | 1/2019 | Brown | G05D 1/0027 |
| 10,448,565 B2* | 10/2019 | Mannefred | G05D 1/0044 |
| 11,579,618 B2* | 2/2023 | Alban | A01D 34/008 |
| 2005/0171644 A1* | 8/2005 | Tani | G05D 1/0259 701/25 |
| 2011/0178669 A1* | 7/2011 | Tanaka | G05D 1/0088 701/25 |
| 2011/0295424 A1* | 12/2011 | Johnson | G05D 1/0265 700/248 |
| 2012/0296495 A1* | 11/2012 | Ozaki | G05D 1/0278 701/25 |
| 2013/0006419 A1* | 1/2013 | Bergstrom | G05D 1/0278 700/245 |
| 2013/0184924 A1* | 7/2013 | Jagenstedt | B60L 15/20 901/1 |
| 2013/0282224 A1* | 10/2013 | Yazaki | G05D 1/0219 701/24 |
| 2014/0229053 A1 | 8/2014 | Tanaka et al. | |
| 2015/0250097 A1* | 9/2015 | Jagenstedt | G05D 1/0219 701/23 |
| 2015/0296707 A1* | 10/2015 | Fukuda | A01D 34/64 701/25 |
| 2016/0062361 A1 | 3/2016 | Nakano et al. | |
| 2016/0165795 A1* | 6/2016 | Balutis | G05D 1/0044 701/25 |
| 2016/0174459 A1* | 6/2016 | Balutis | A01D 34/008 701/25 |
| 2017/0020064 A1* | 1/2017 | Doughty | A01D 34/008 |
| 2018/0139896 A1* | 5/2018 | Wahlgren | G05D 1/0214 |
| 2019/0094857 A1* | 3/2019 | Jertberg | G05D 1/0282 |
| 2019/0141888 A1* | 5/2019 | Balutis | A01D 34/008 701/25 |
| 2020/0154632 A1* | 5/2020 | Chen | G05D 1/0221 |
| 2020/0173784 A1* | 6/2020 | Chang | G05D 1/0221 |
| 2021/0100161 A1* | 4/2021 | Balutis | B25J 9/1674 |
| 2022/0306152 A1* | 9/2022 | Zhang | B60W 30/18159 |
| 2023/0176583 A1* | 6/2023 | Suzuki | G05D 1/0219 701/26 |

OTHER PUBLICATIONS

Official Communication issued in corresponding European Patent Application No. 20891453.1, mailed on Nov. 8, 2023.

Kang et al., "A Research on Area Coverage Algorithm for Robotics", International Conference of Intelligent Robotic and Control Engineering, IEEE, Aug. 24, 2018, pp. 6-13.

* cited by examiner

[FIG. 1]
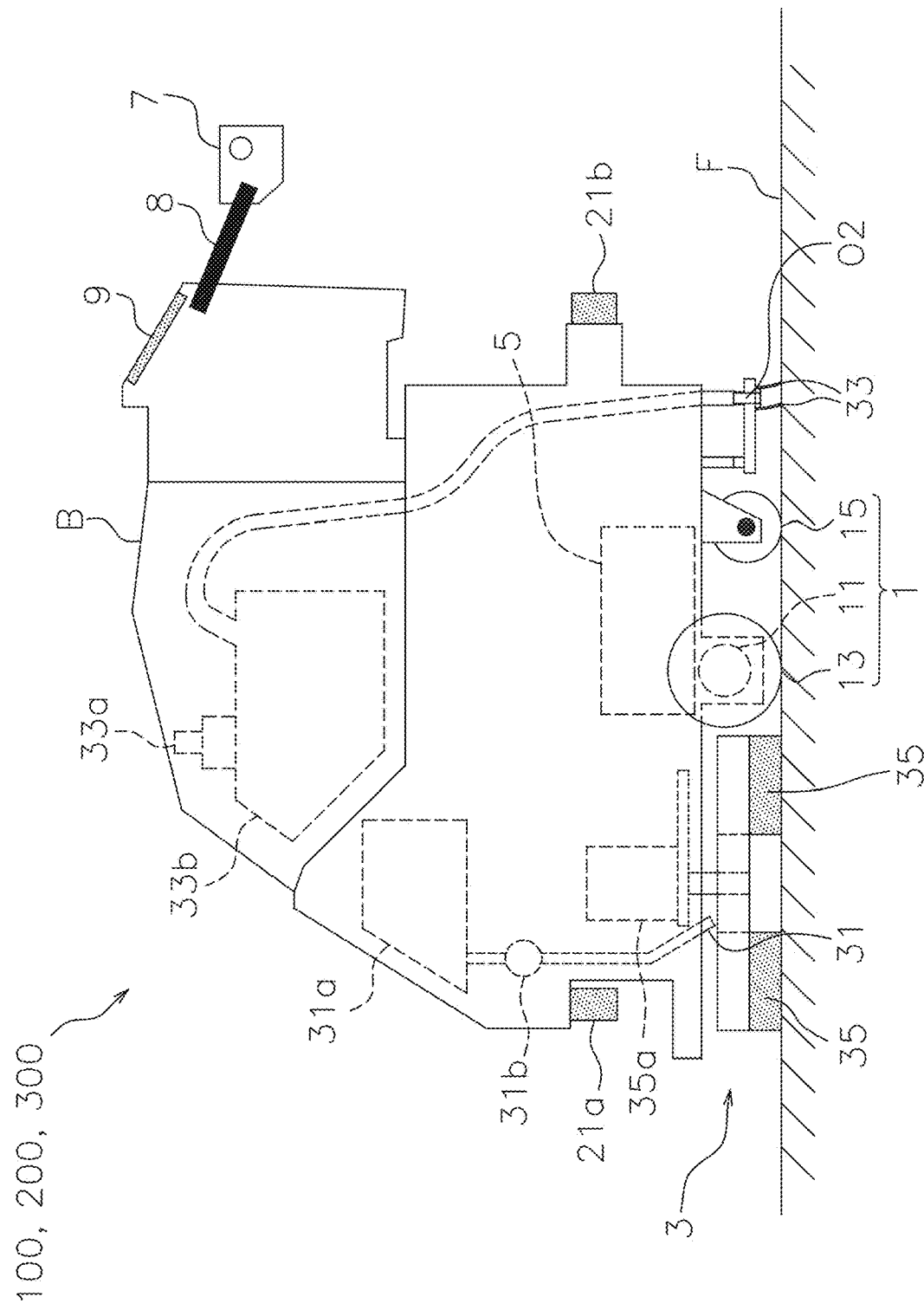

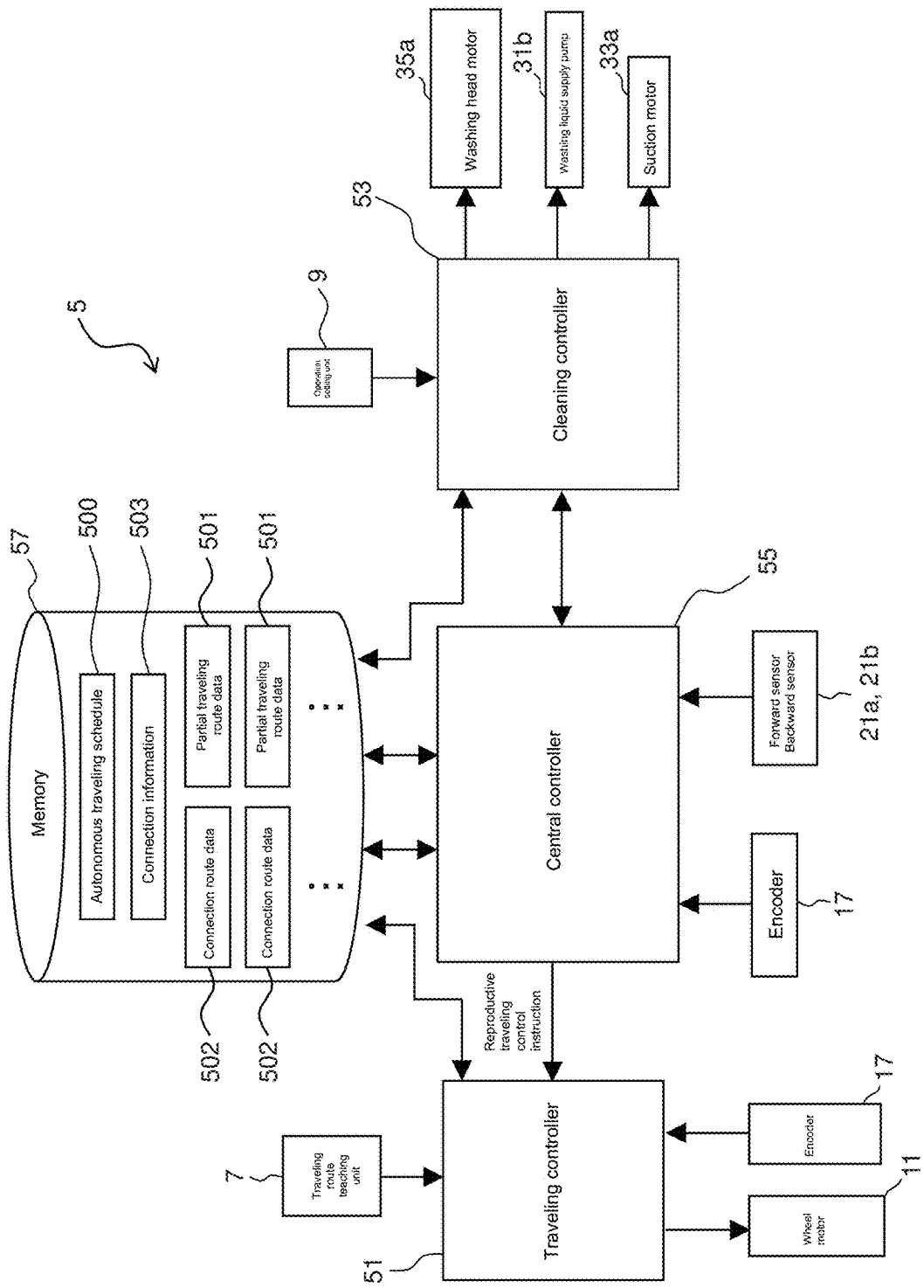
[FIG. 2]

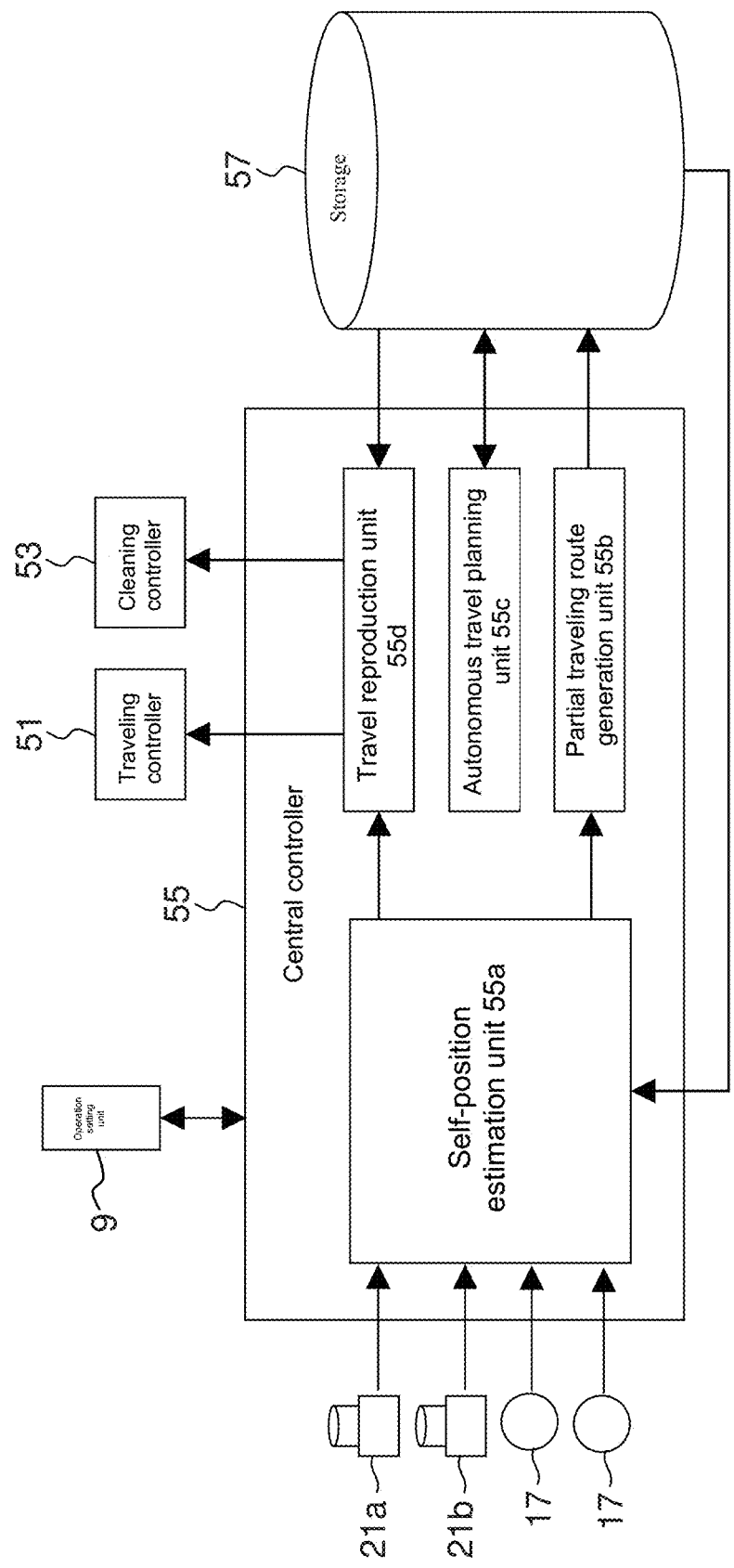
[FIG. 3]

[FIG. 4]
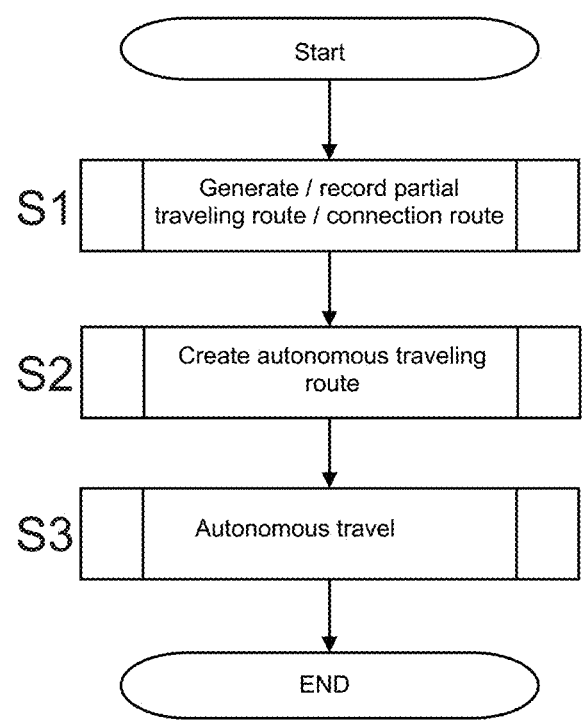

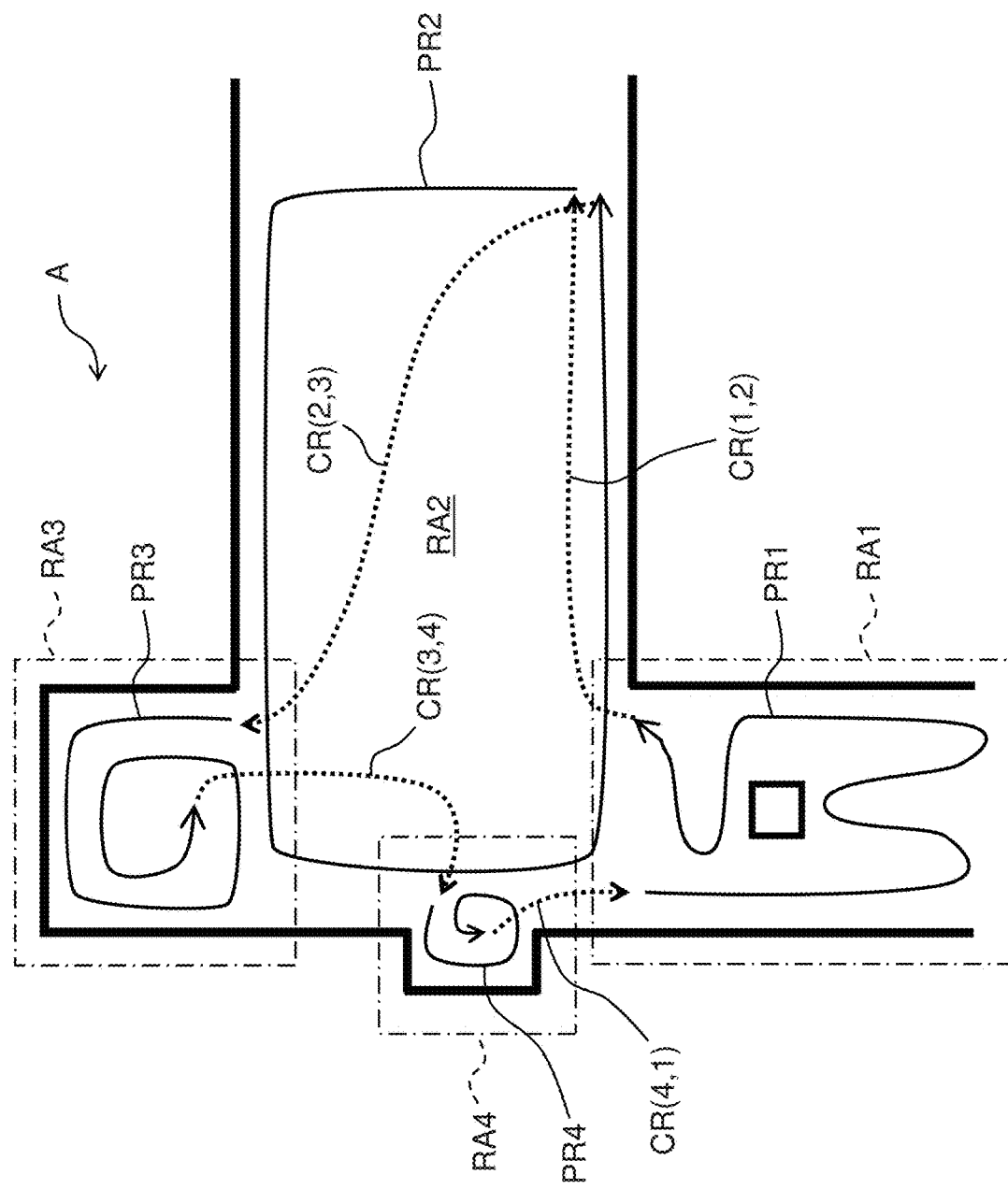
[FIG. 5]

【FIG. 6】
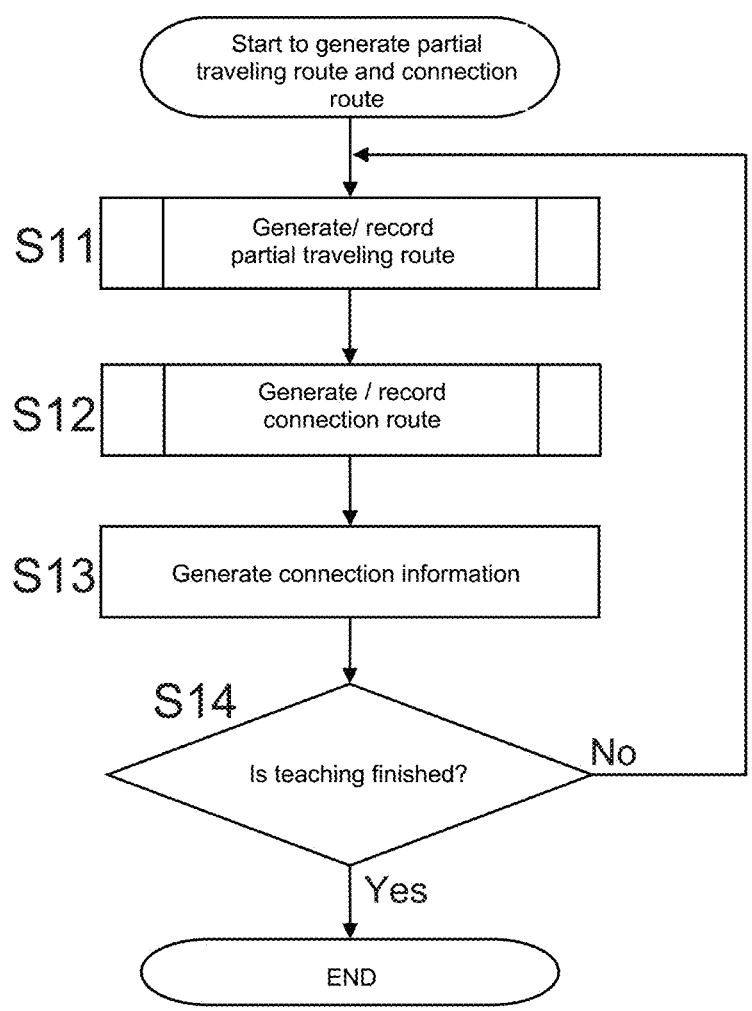

[FIG. 7]

| Connection Route | Connection Source | Connection Destination |
|---|---|---|
| Connection route #1 | Partial traveling route #1 | Route #2 |
| Connection route #2 | Route #2 | Partial traveling route #3 |
| Connection route #3 | Partial traveling route #3 | Partial traveling route #4 |
| Connection route #4 | Partial traveling route #4 | Partial traveling route #1 |

503

[FIG. 8]
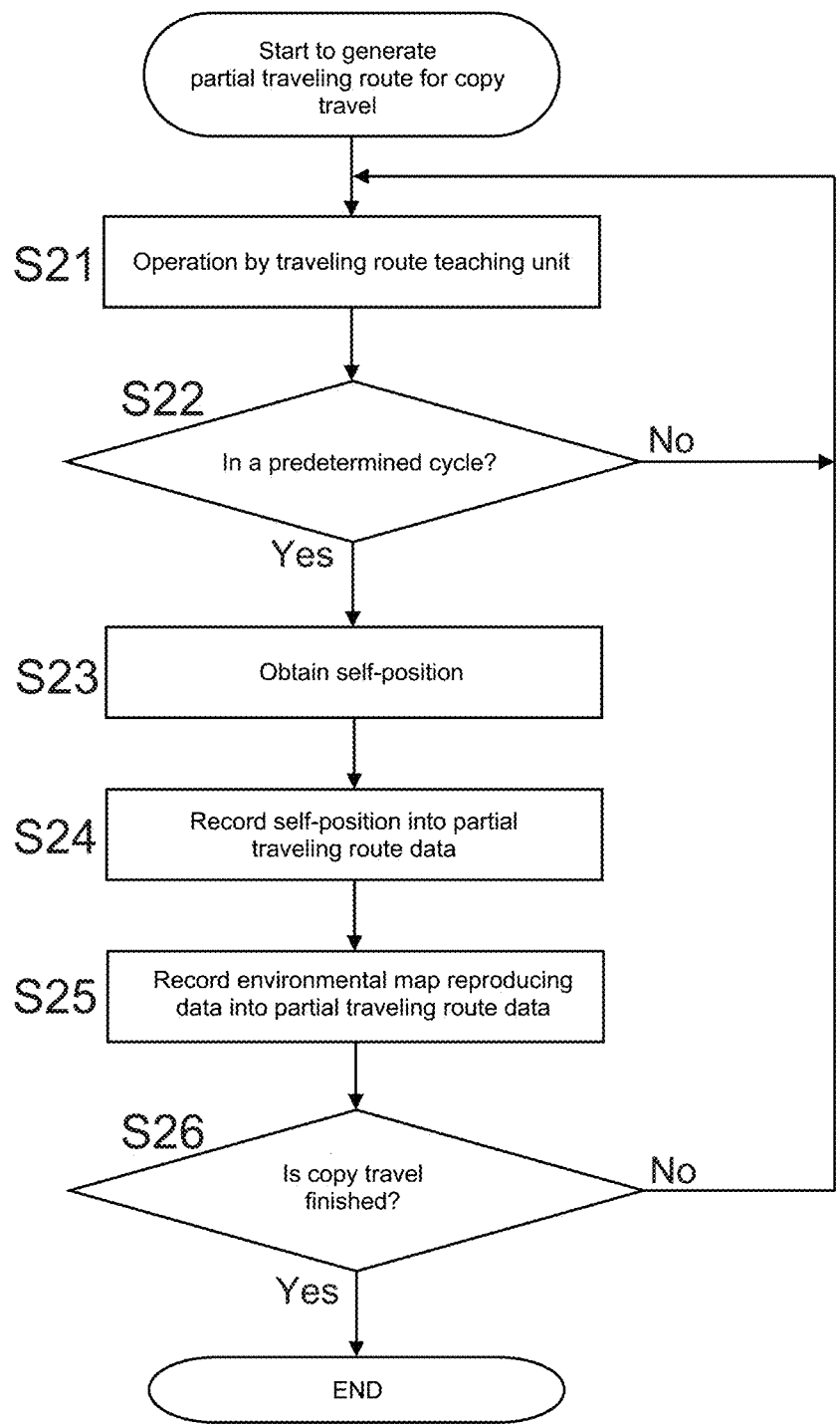

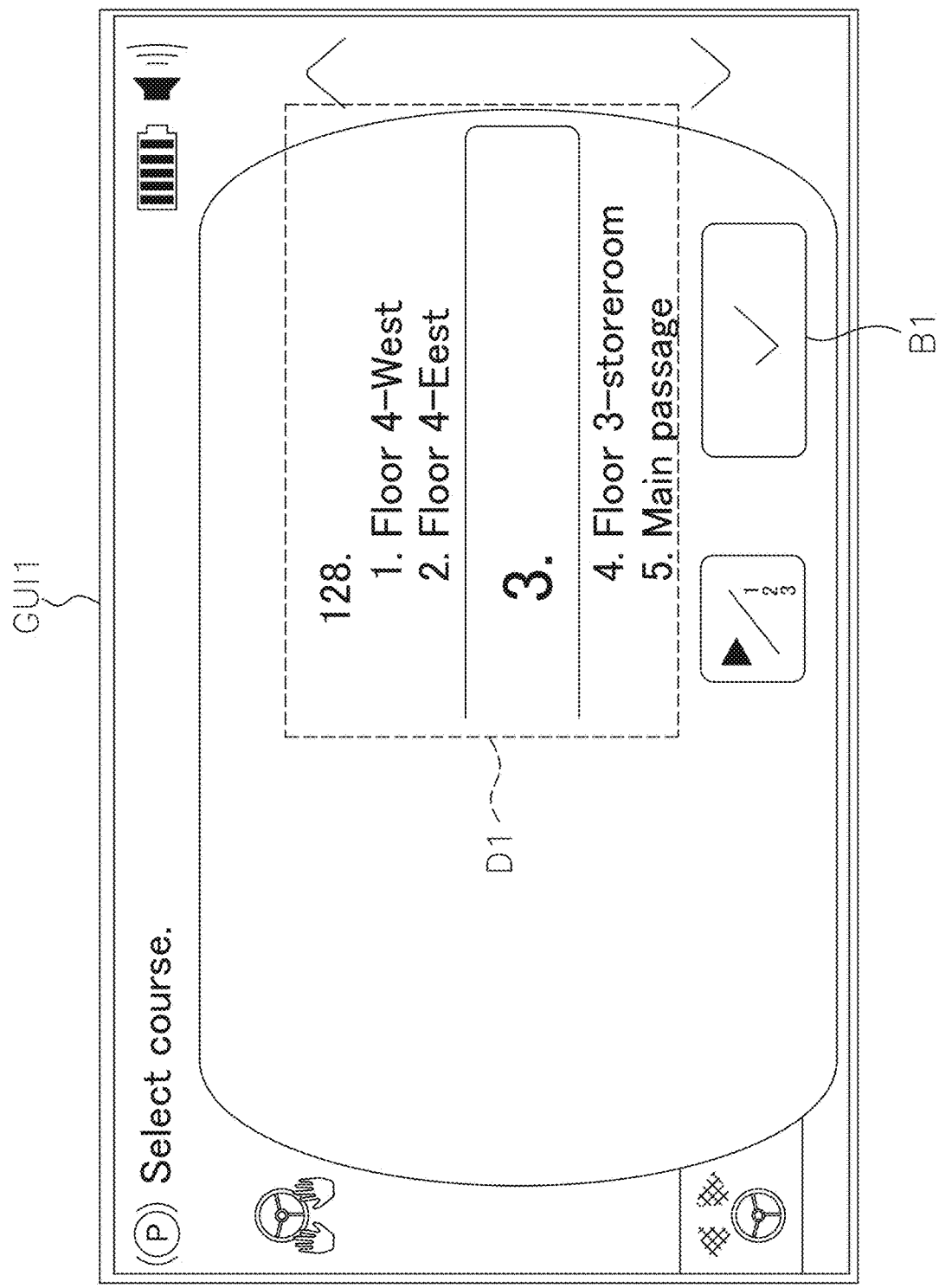
[FIG. 9A]

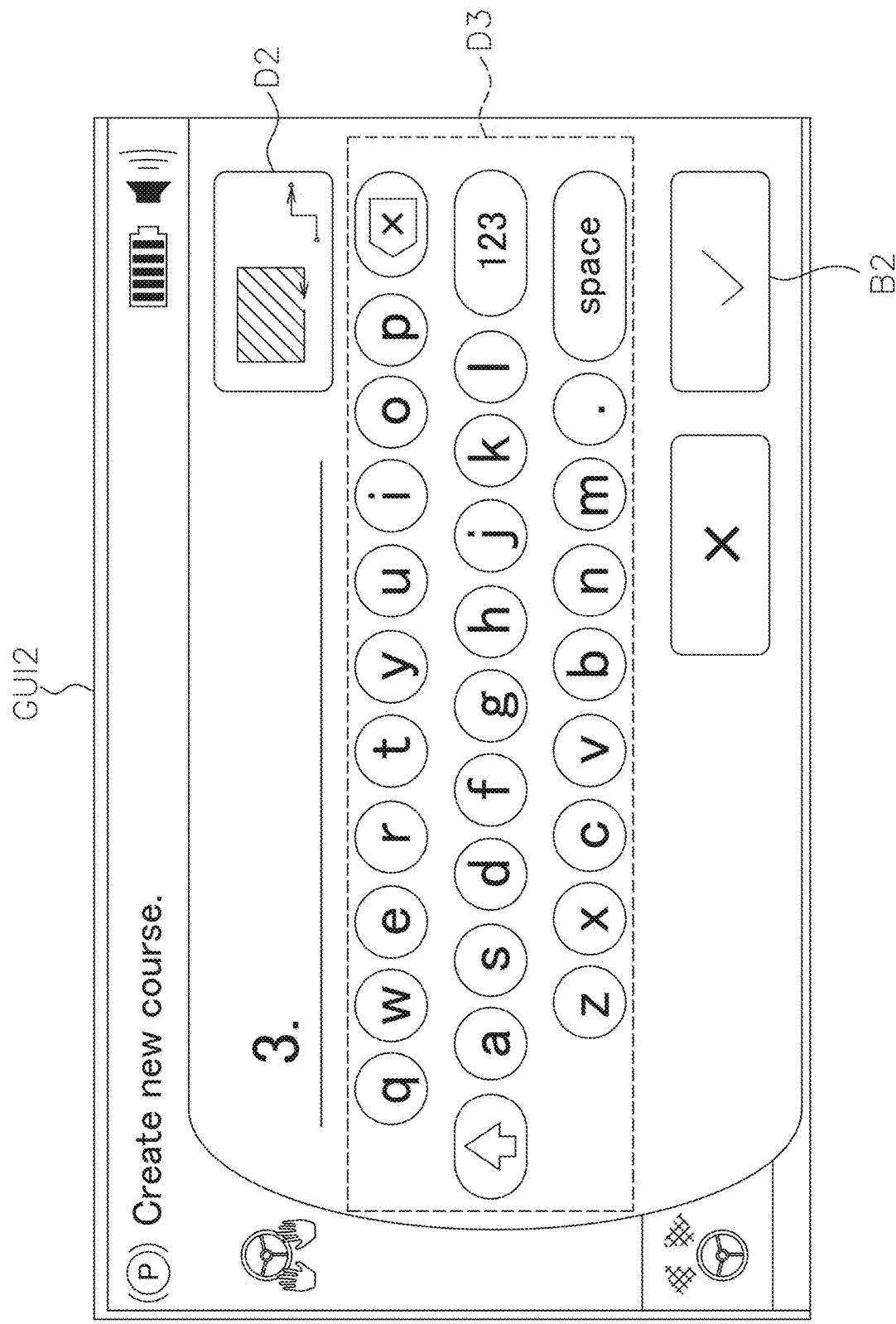

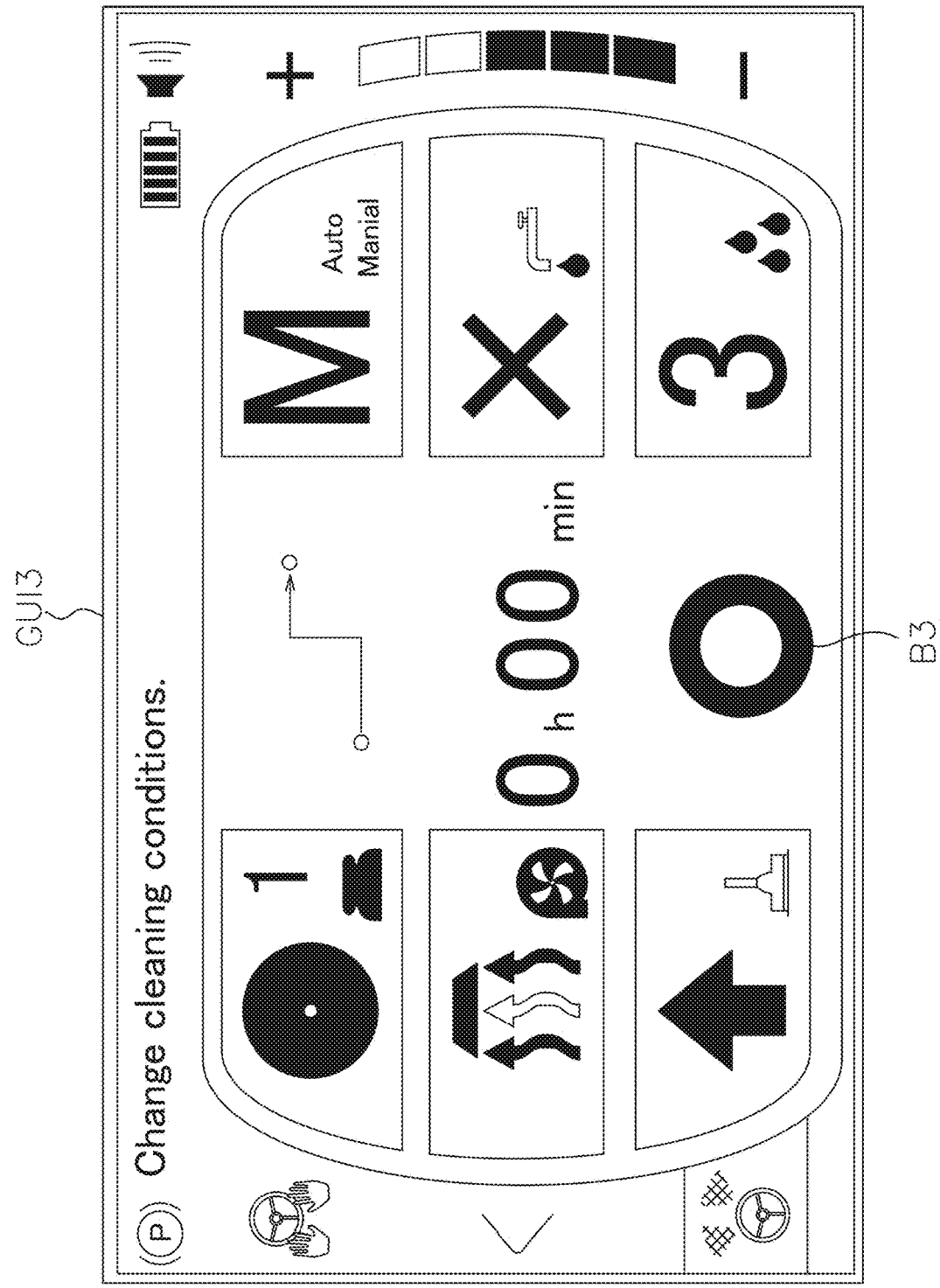
[FIG. 9C]

[FIG. 9D]
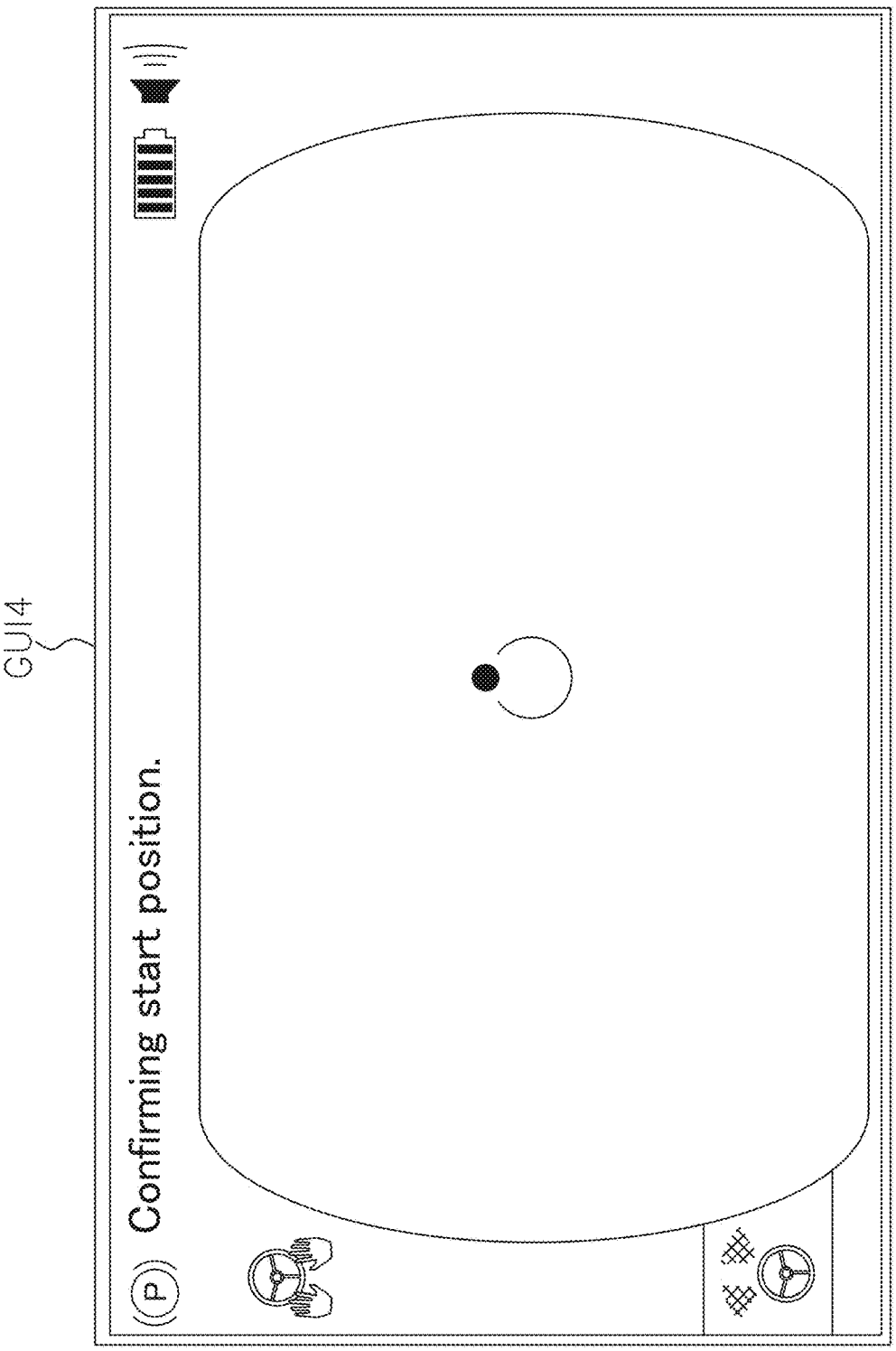

[FIG. 9E]
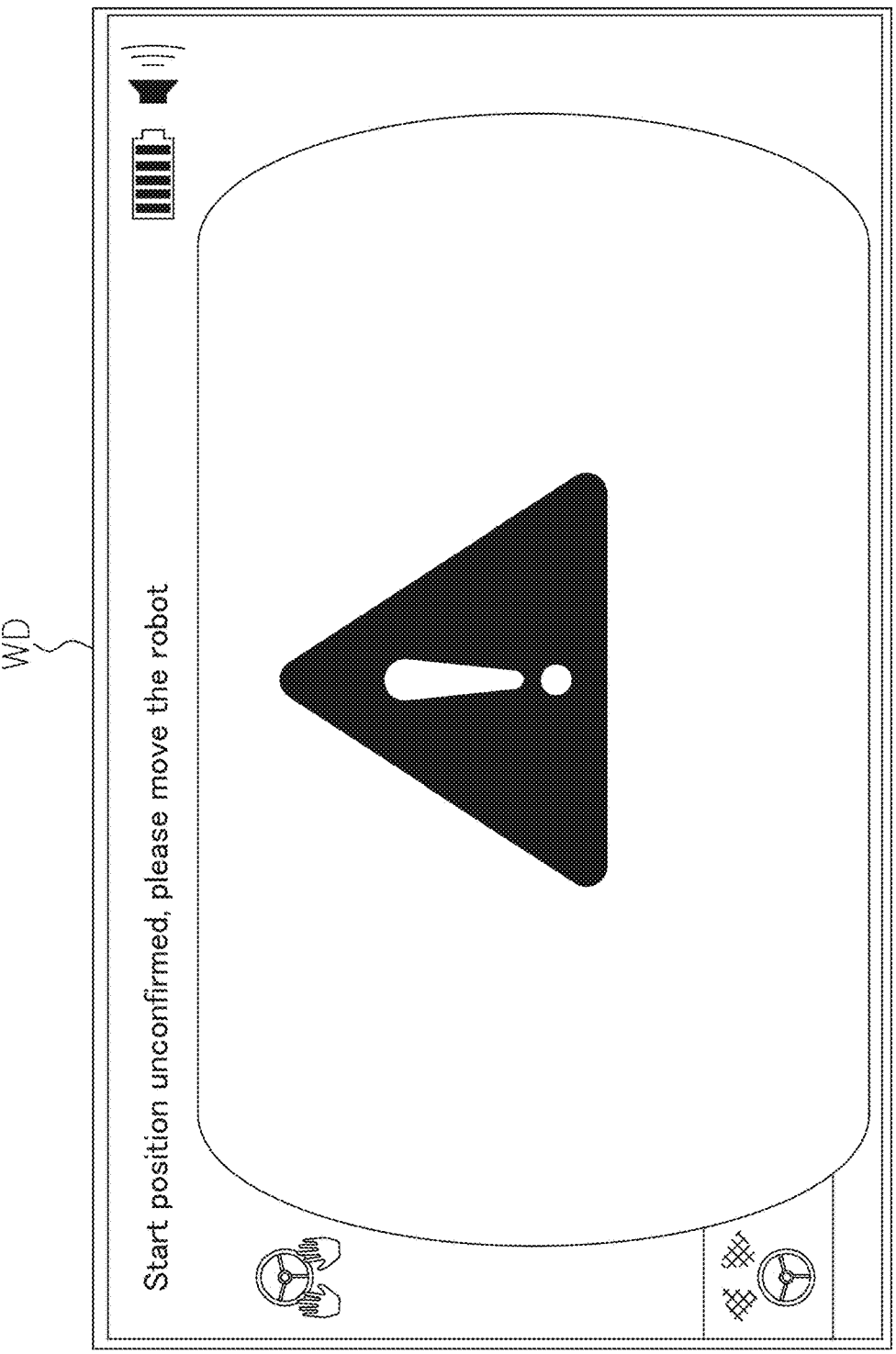

[FIG. 9F]
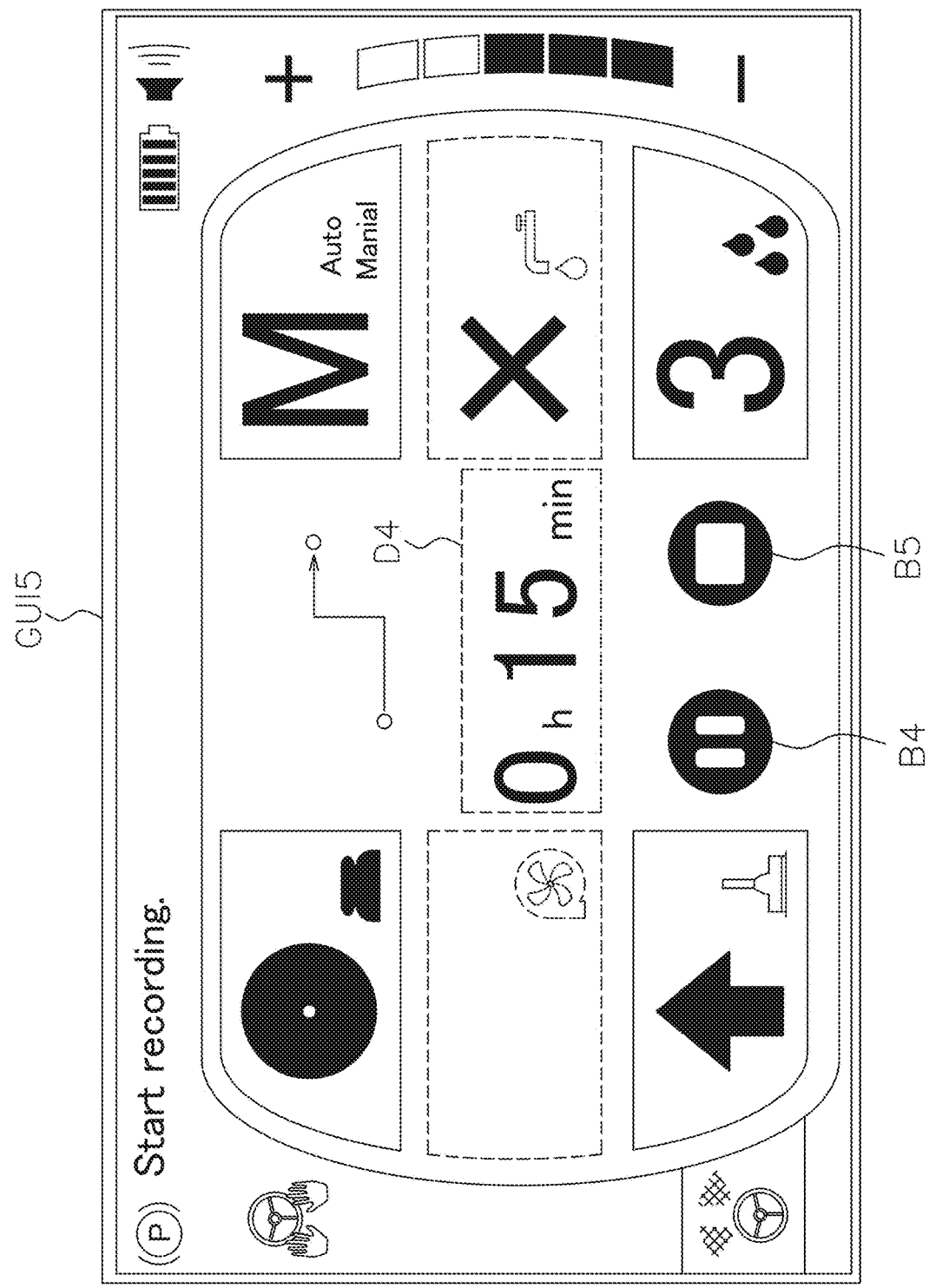

[FIG. 9G]
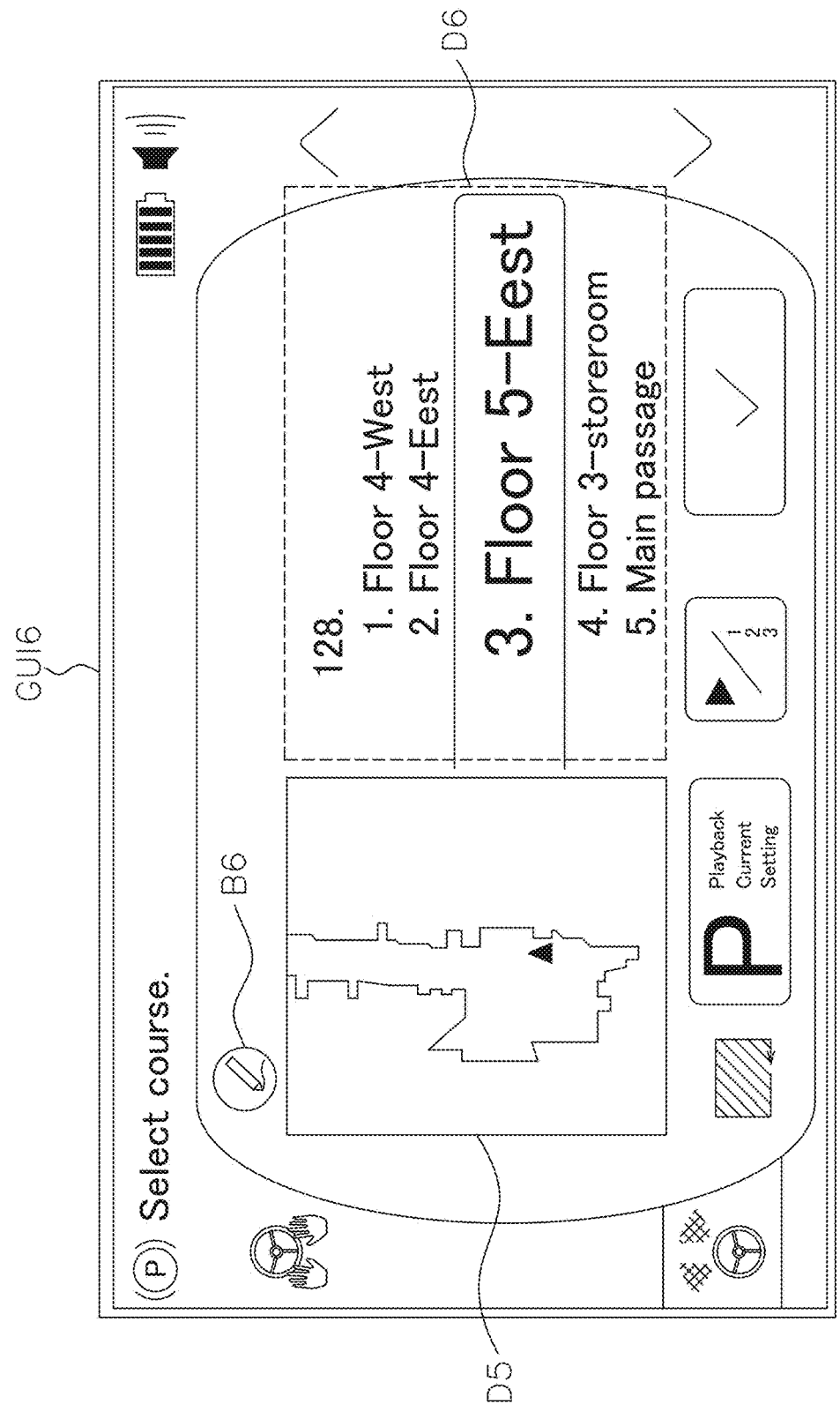

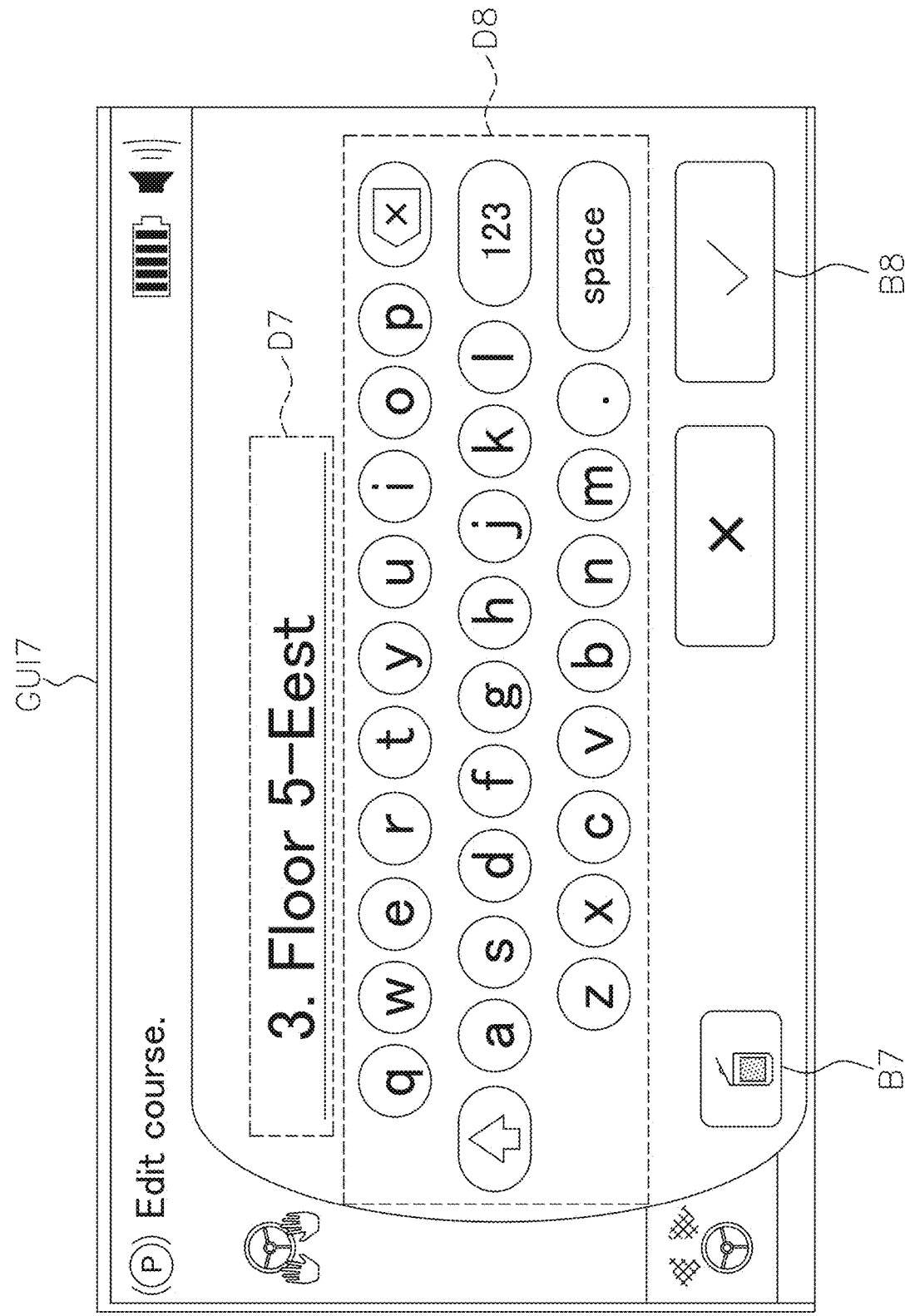
[FIG. 9H]

[FIG. 10]
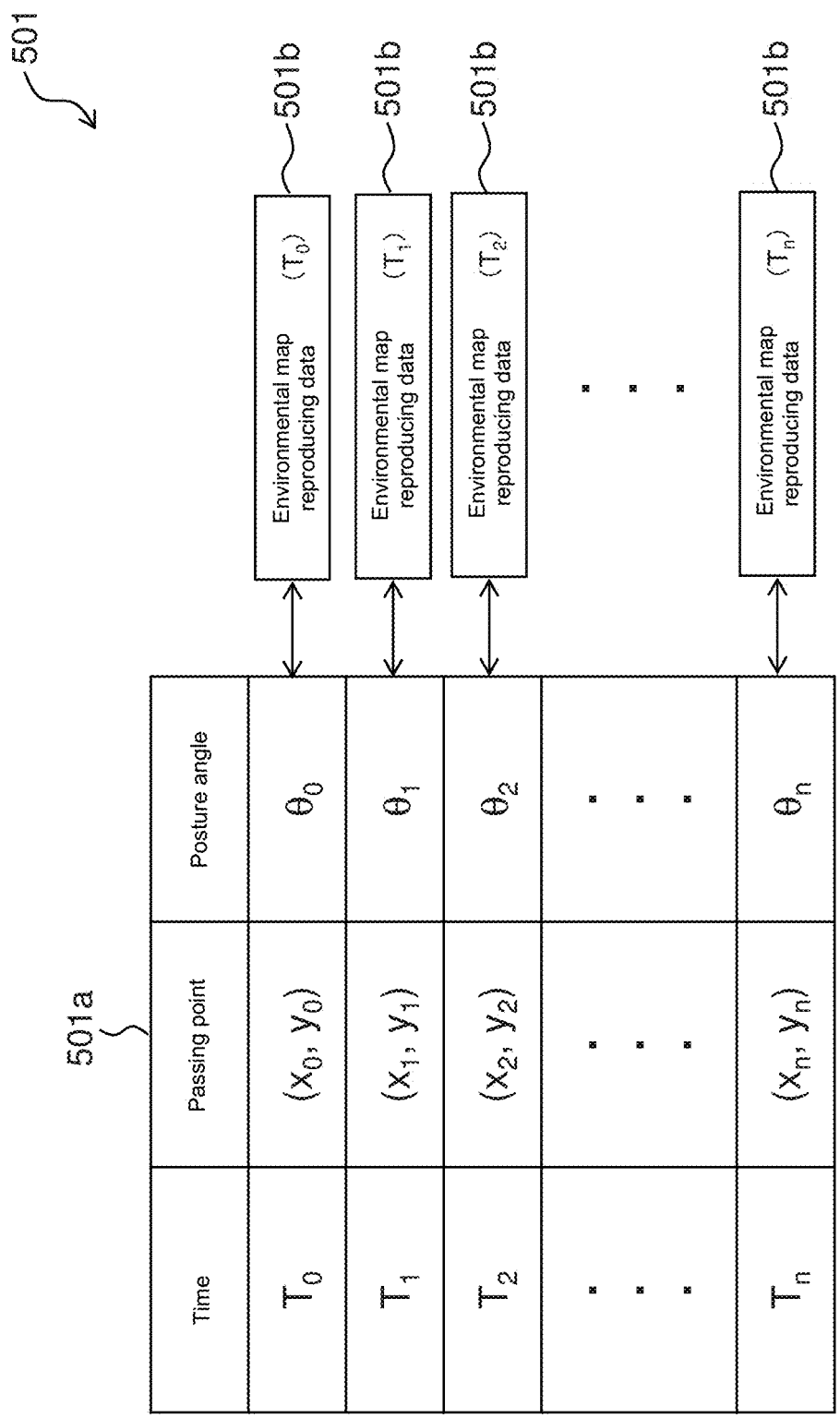

[FIG. 11]
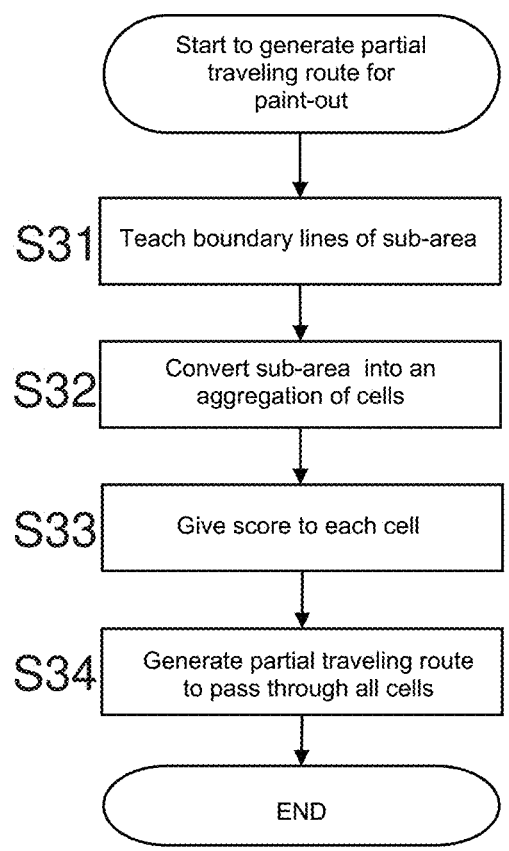

[FIG. 12]
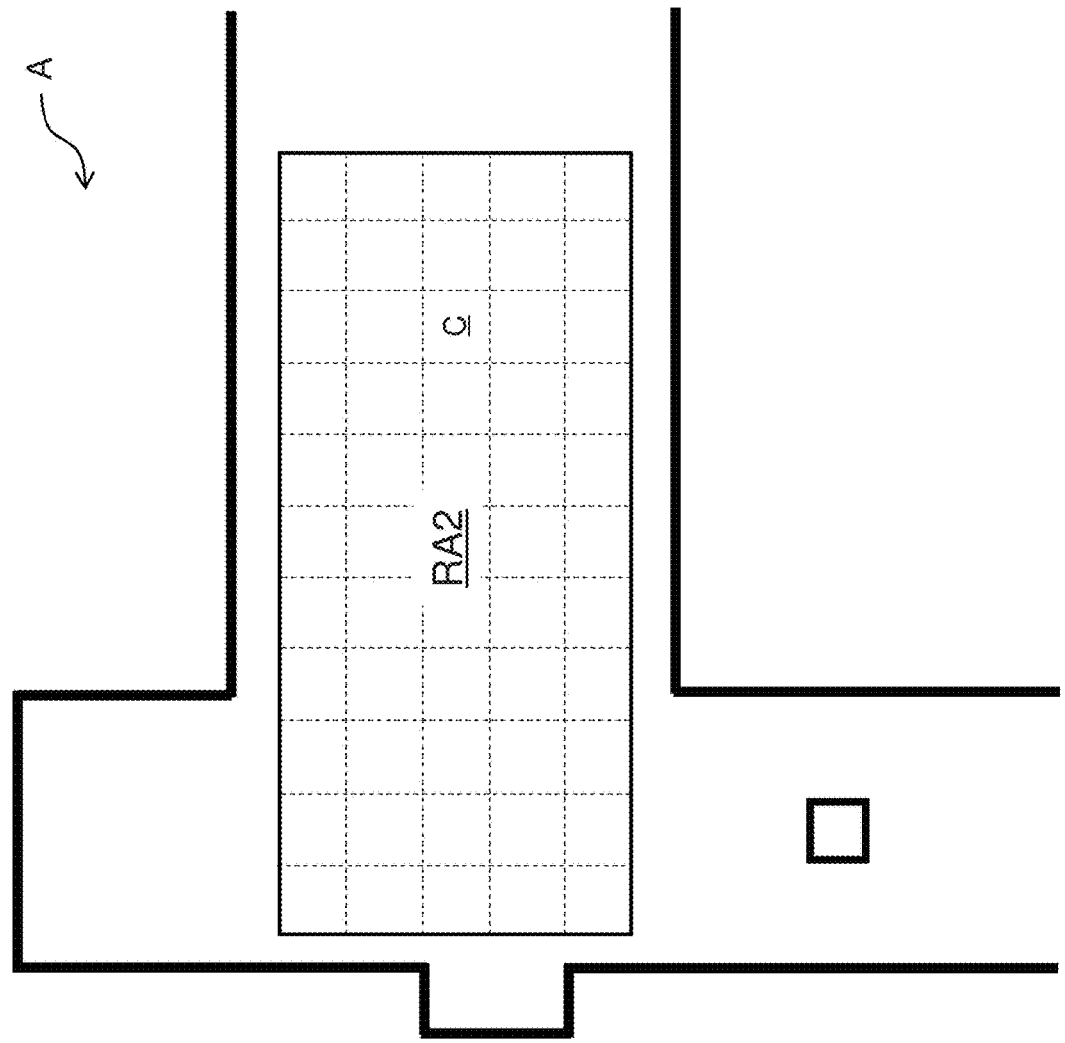

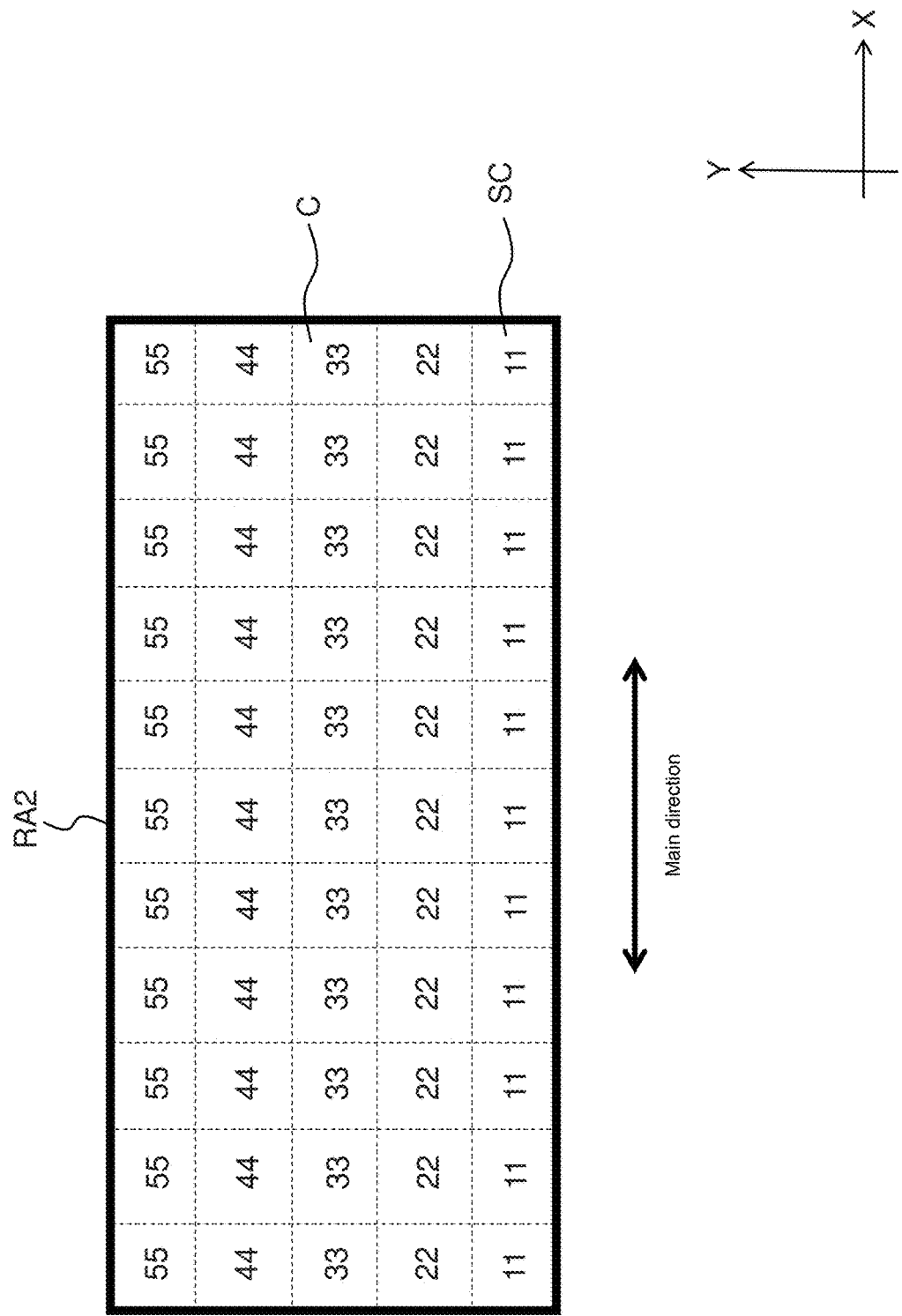
[FIG. 13]

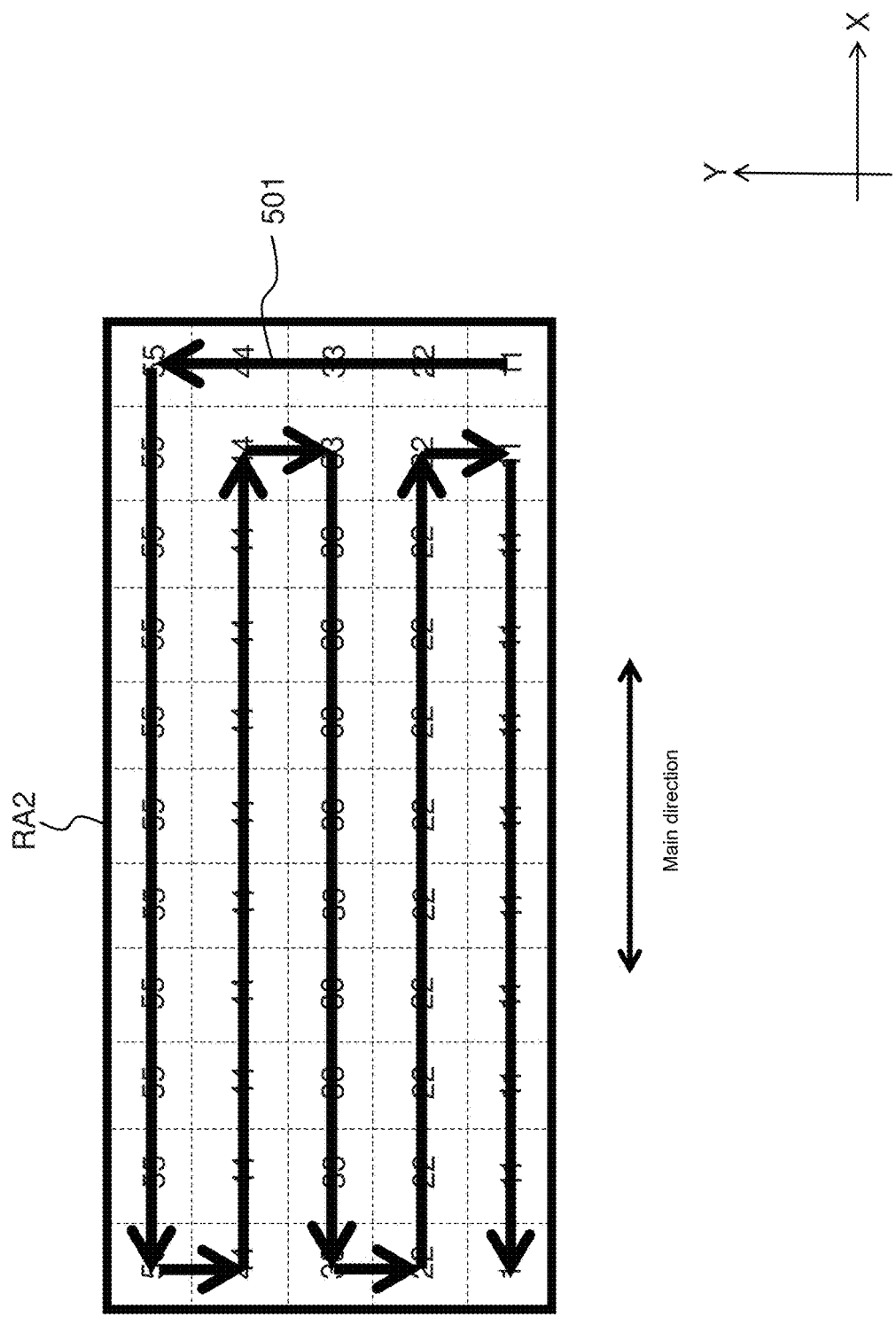
[FIG. 14]

[FIG. 15]
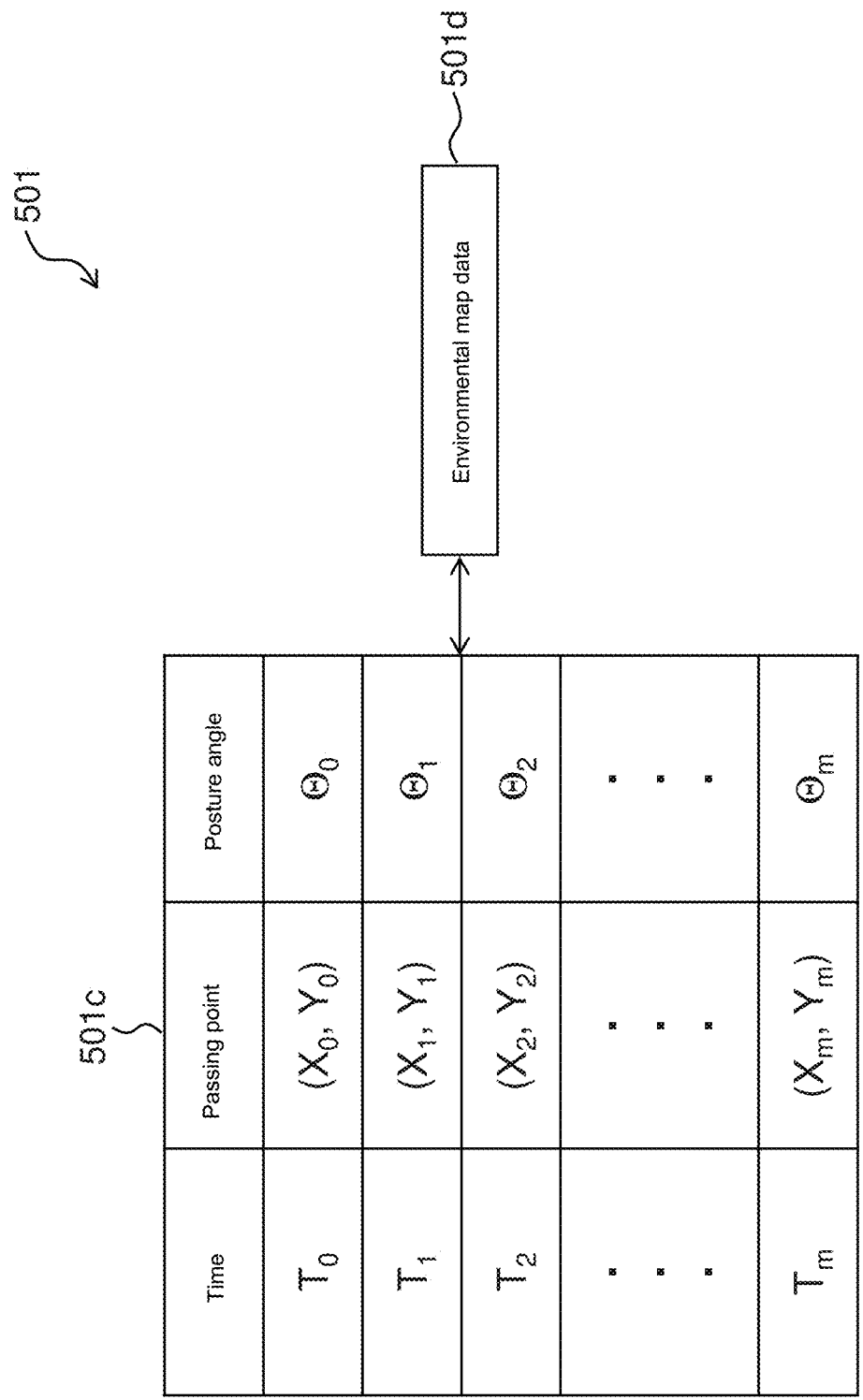

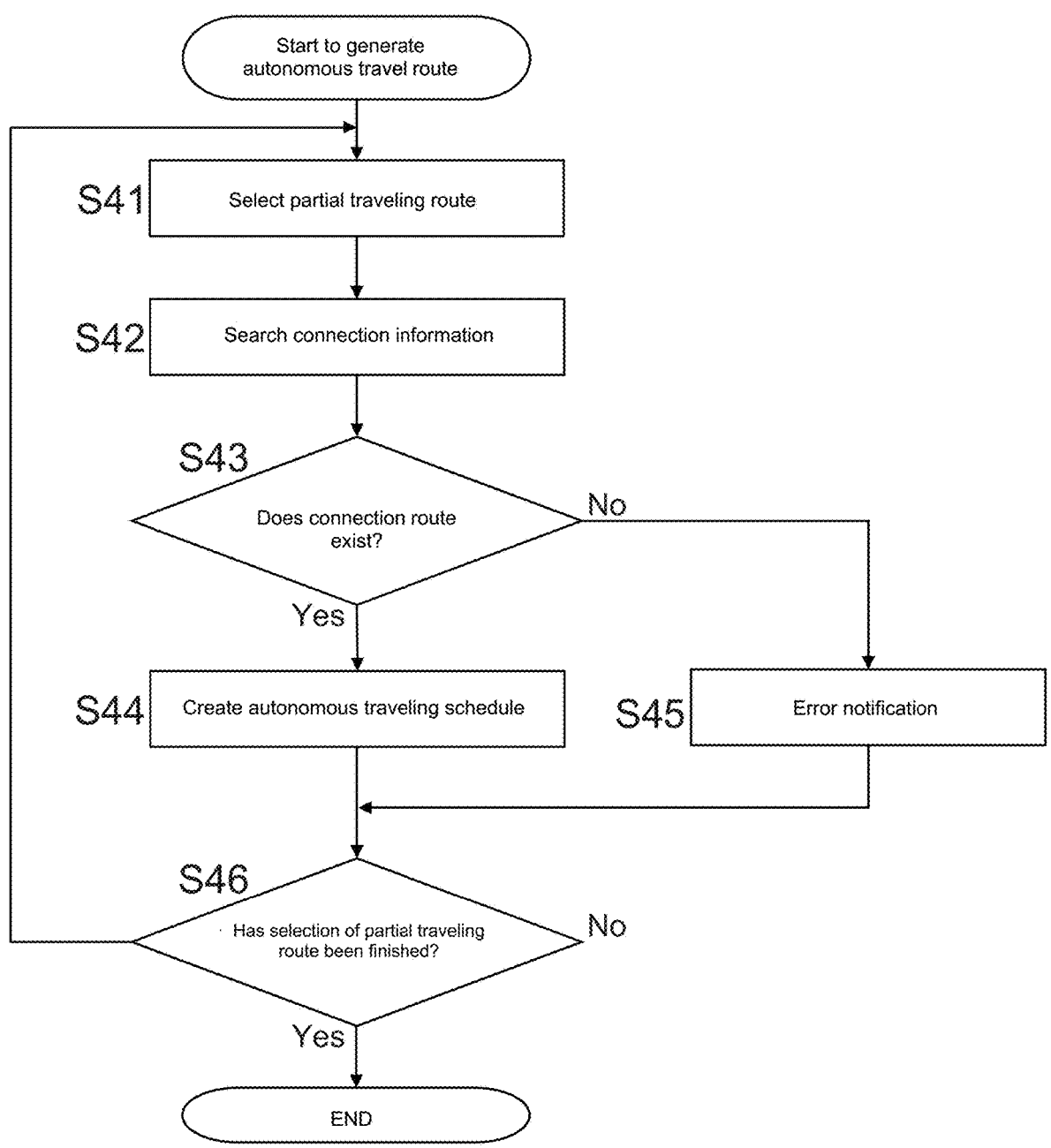
【FIG. 16】

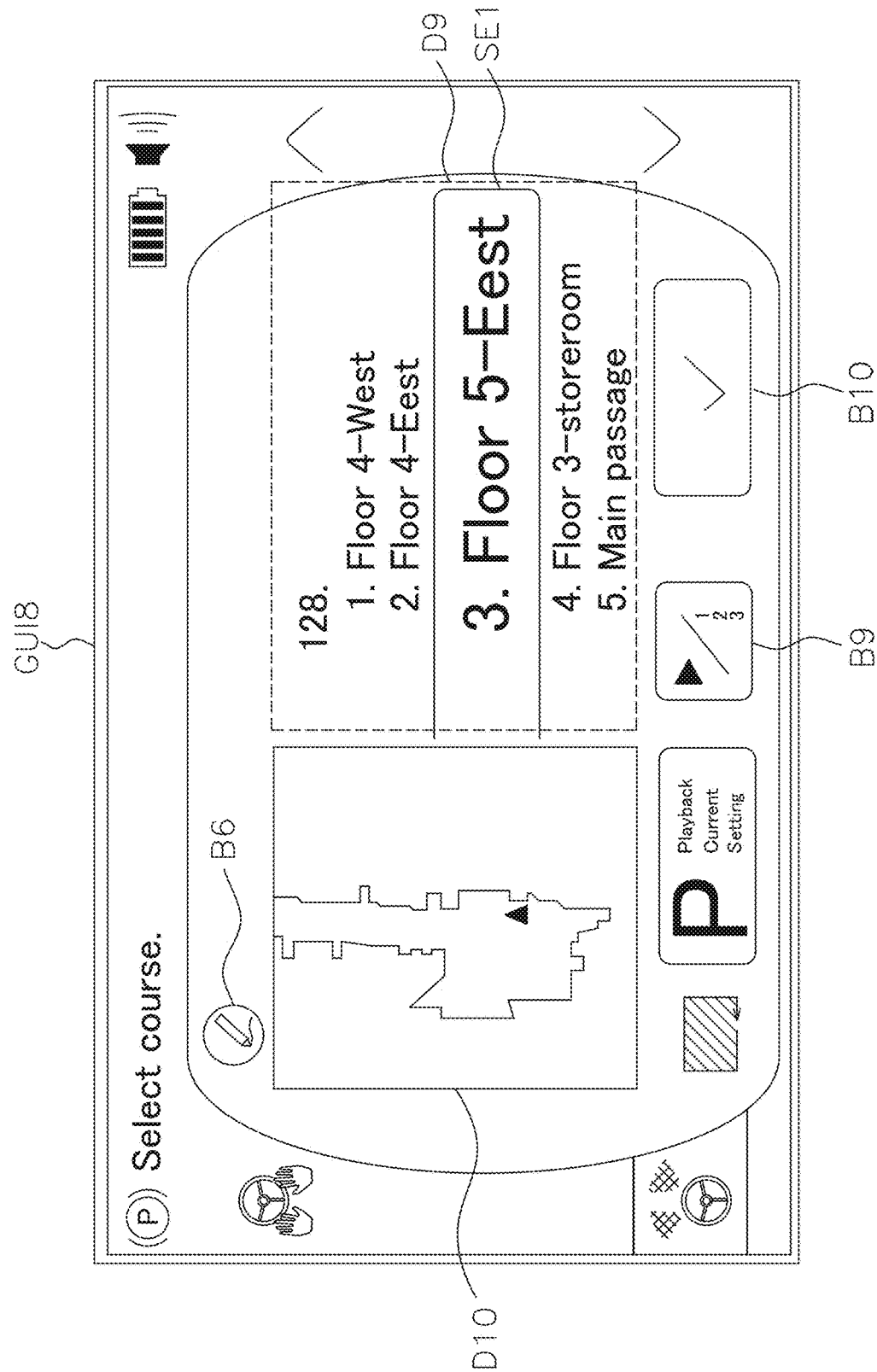
[FIG. 17]

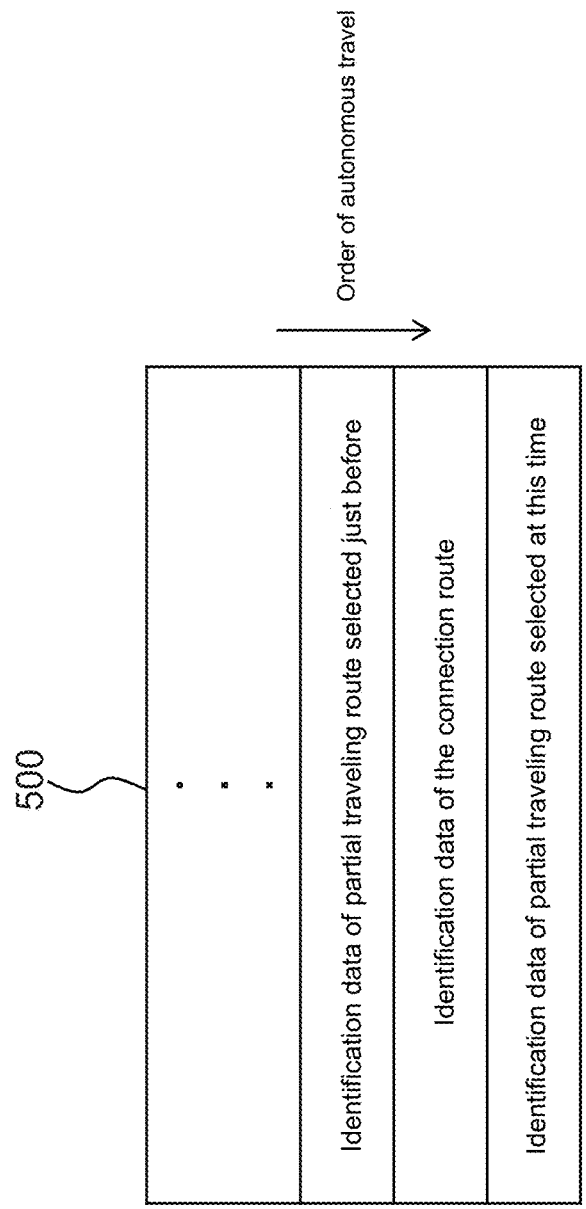
[FIG. 18]

[FIG. 19]
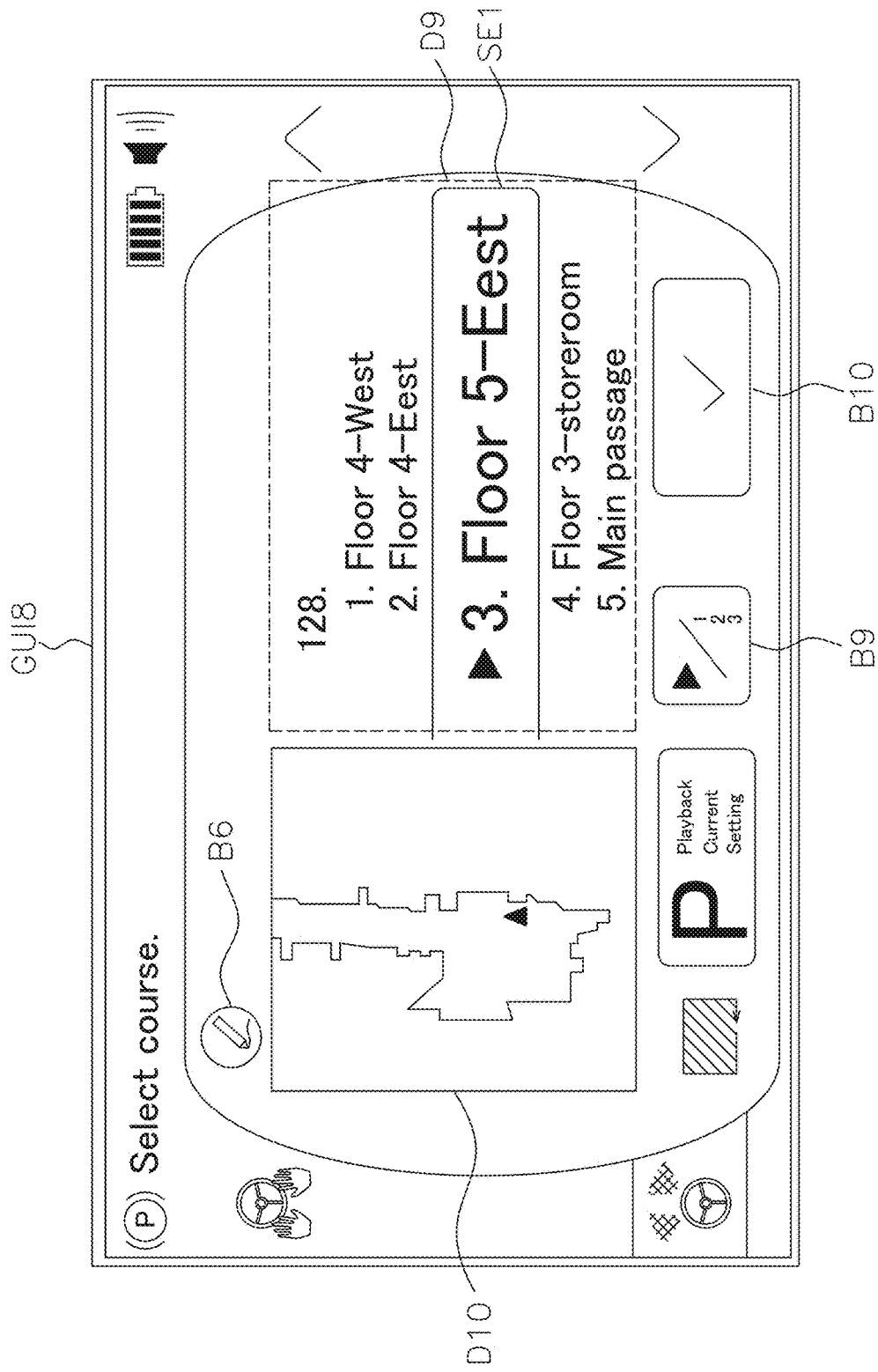

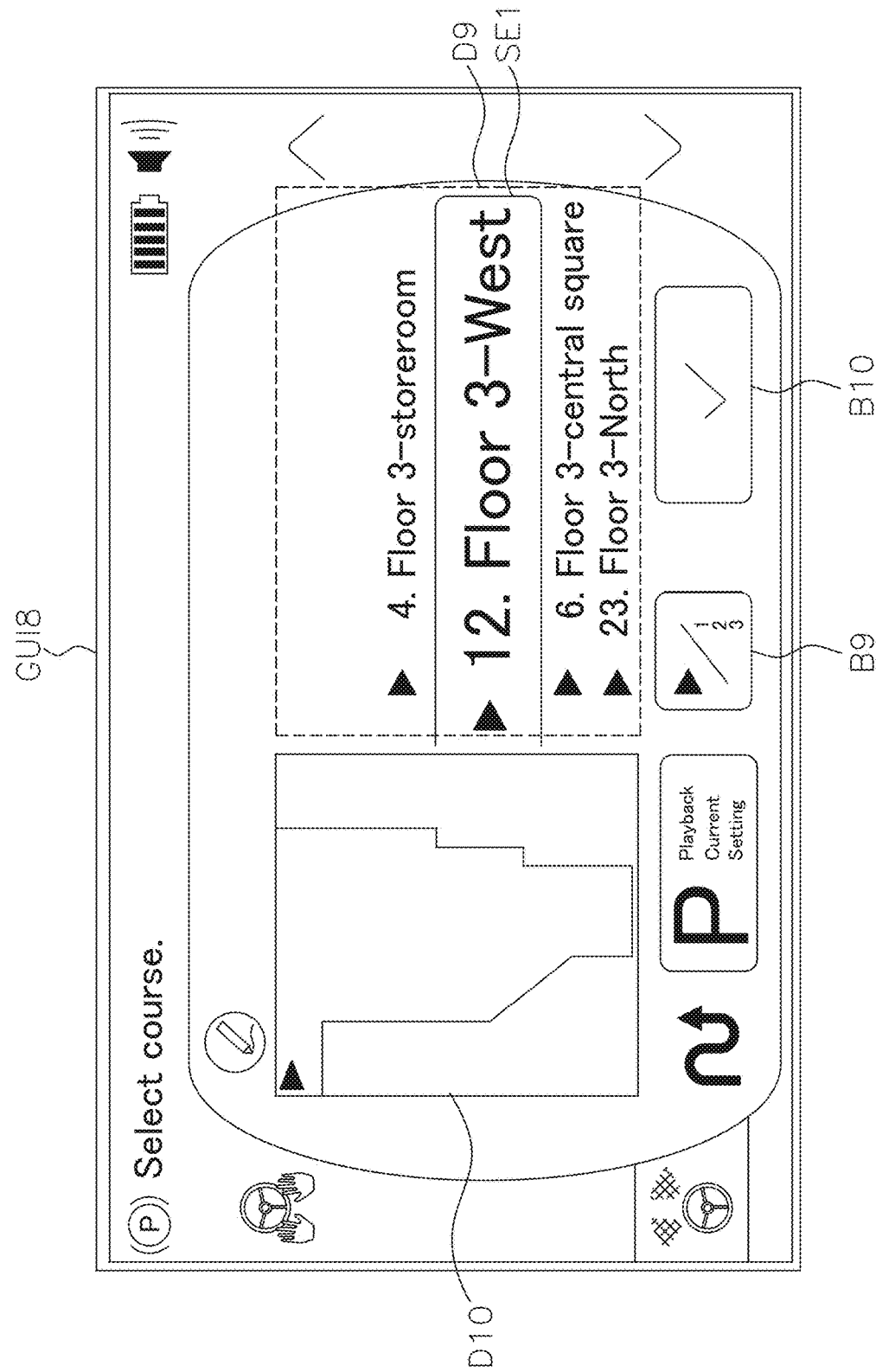

[FIG. 21A]
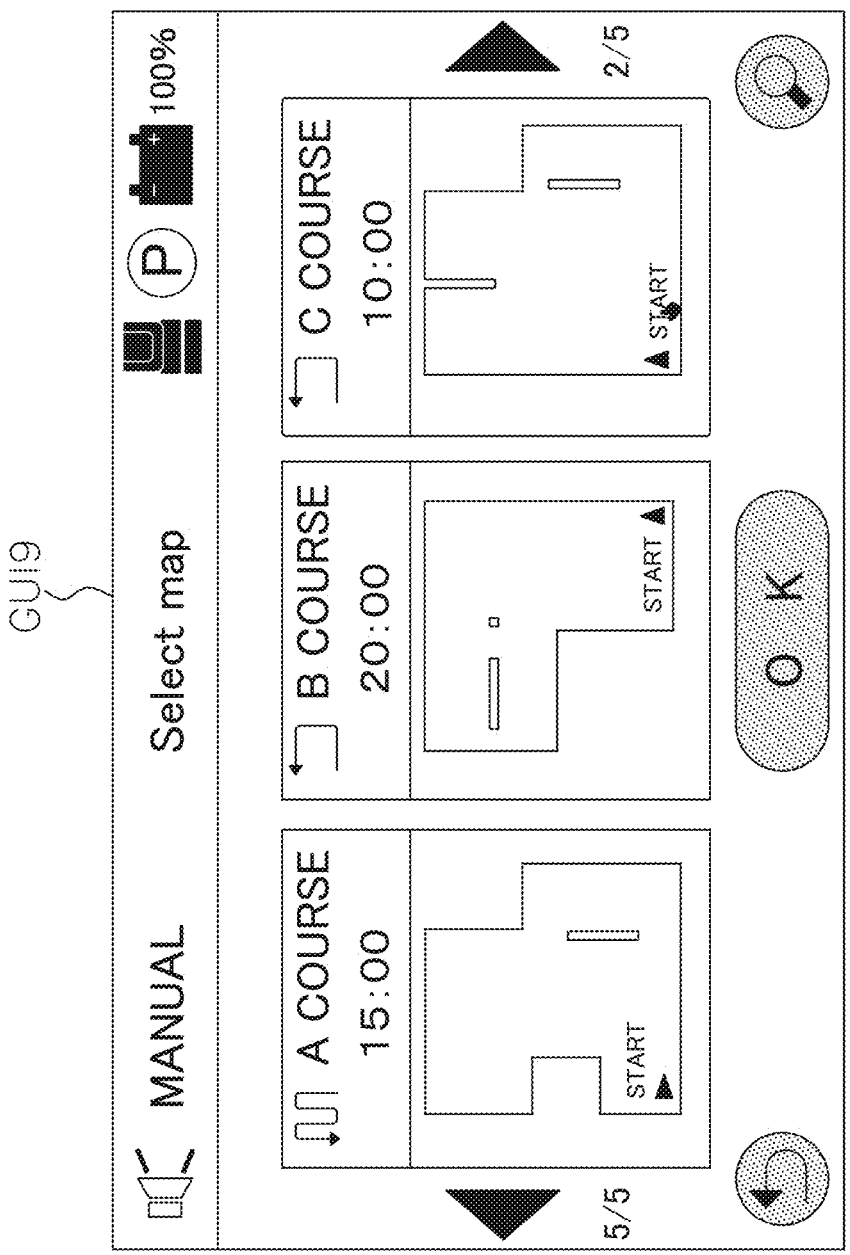

[FIG. 21B]
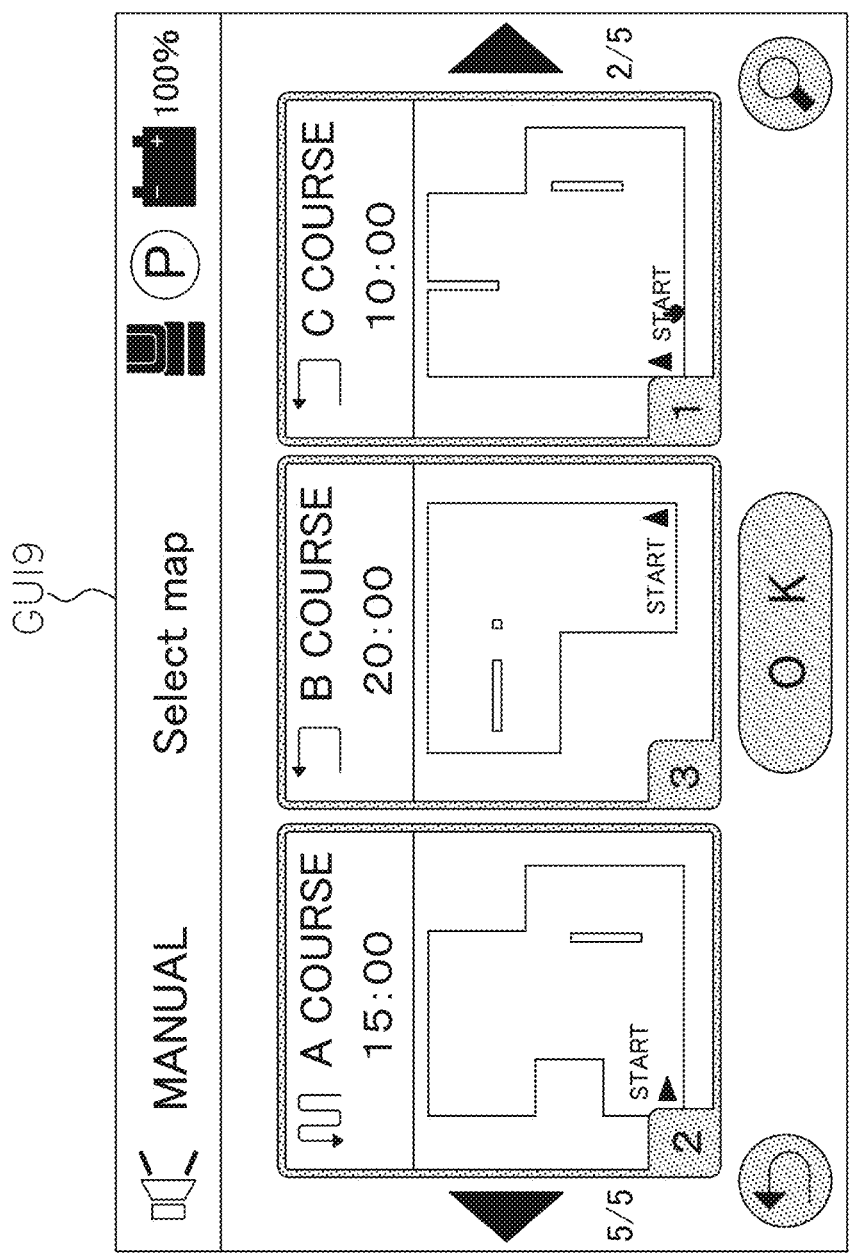

[FIG. 21C]
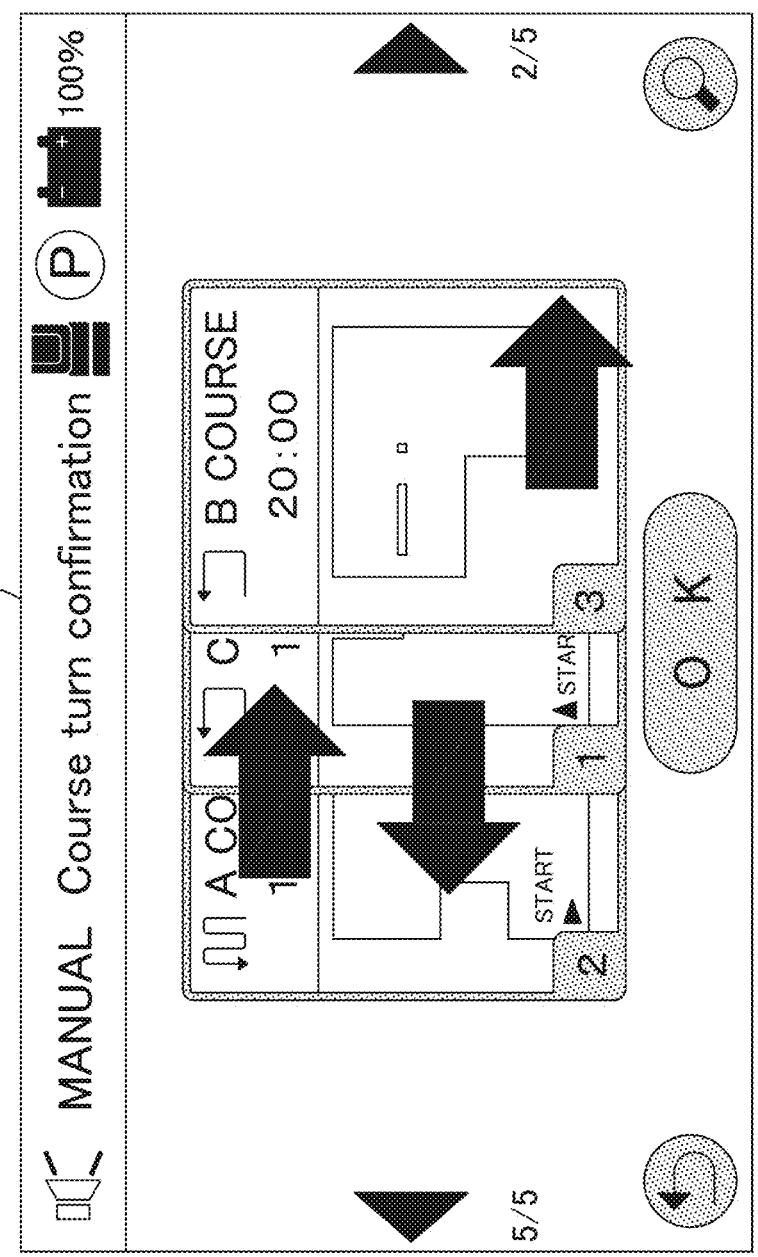

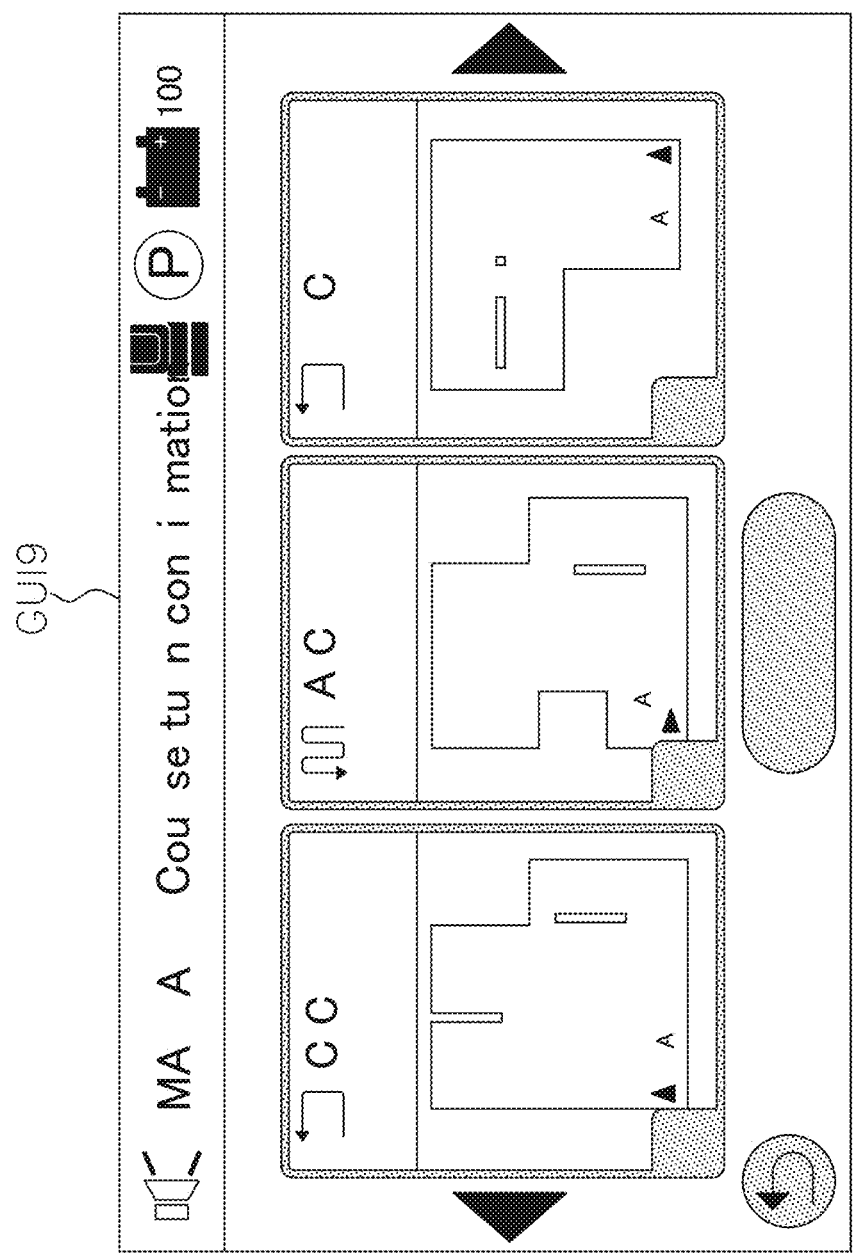

[FIG. 22]
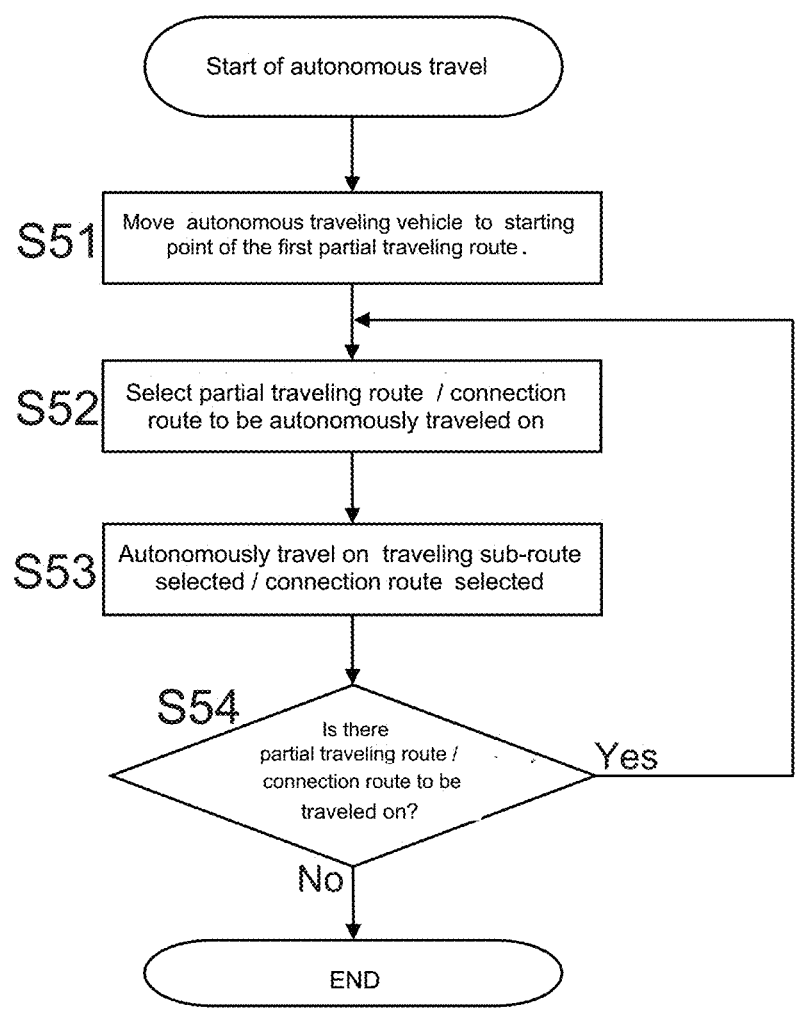

[FIG. 23A]
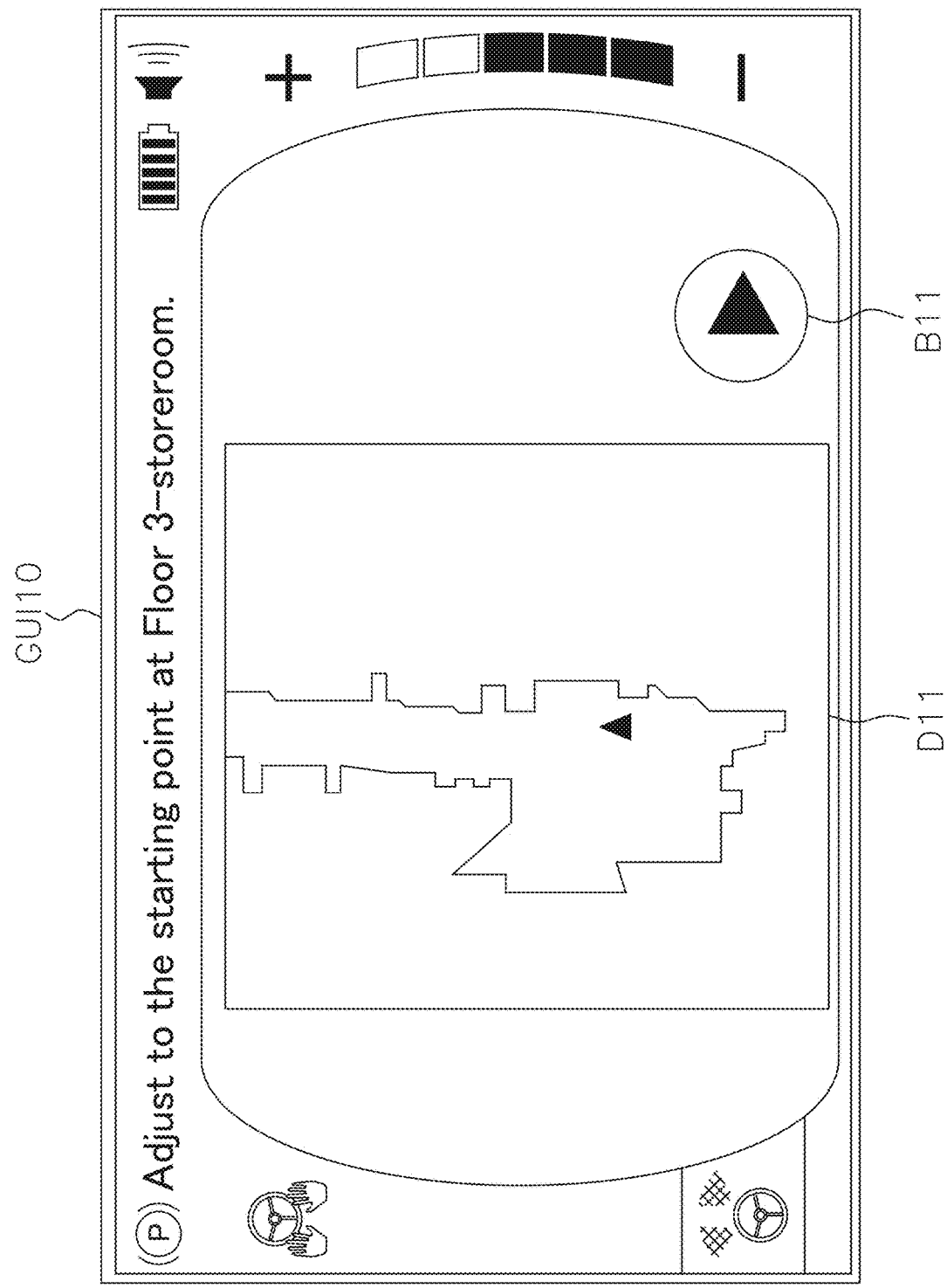

[FIG. 23B]
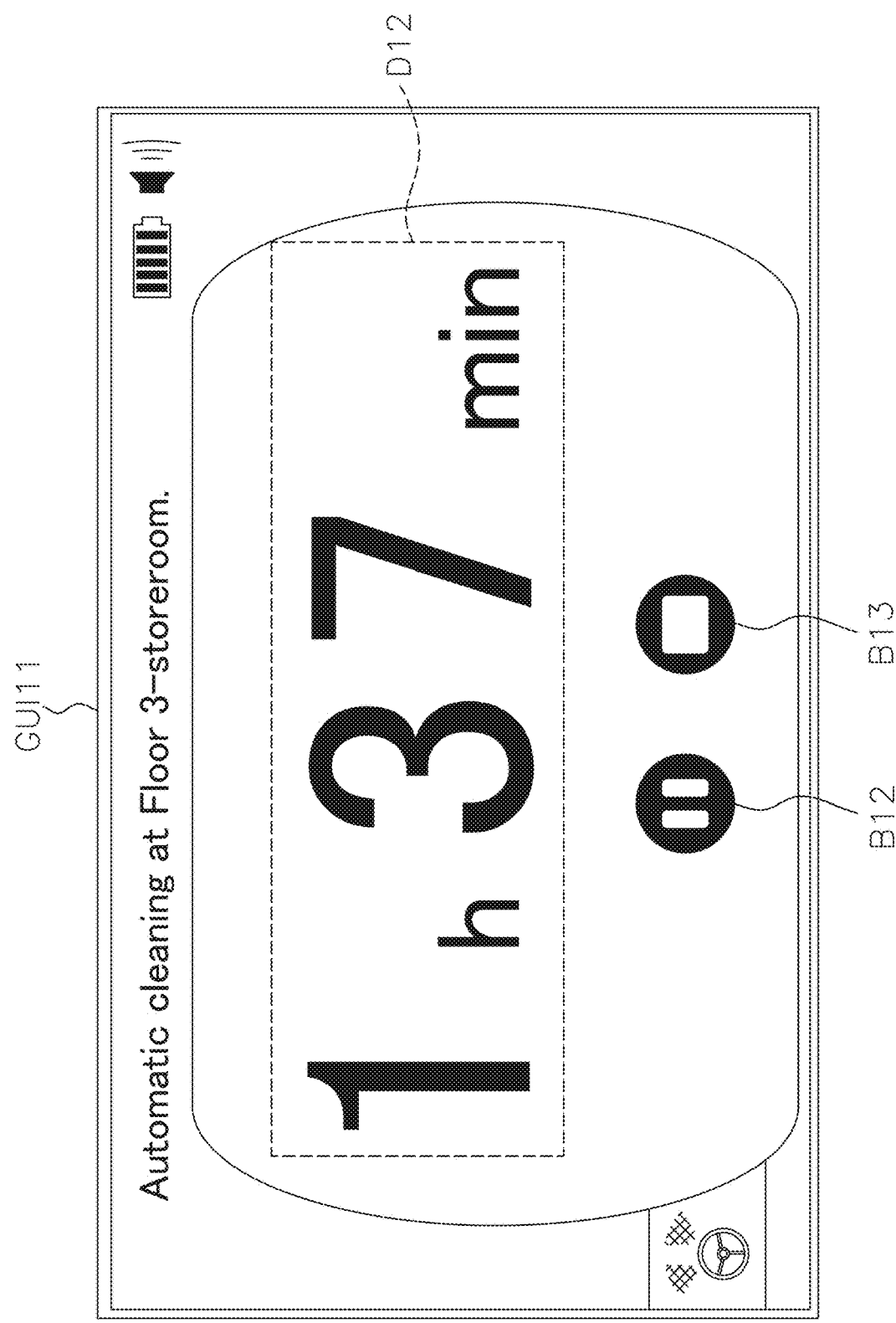

[FIG. 24]
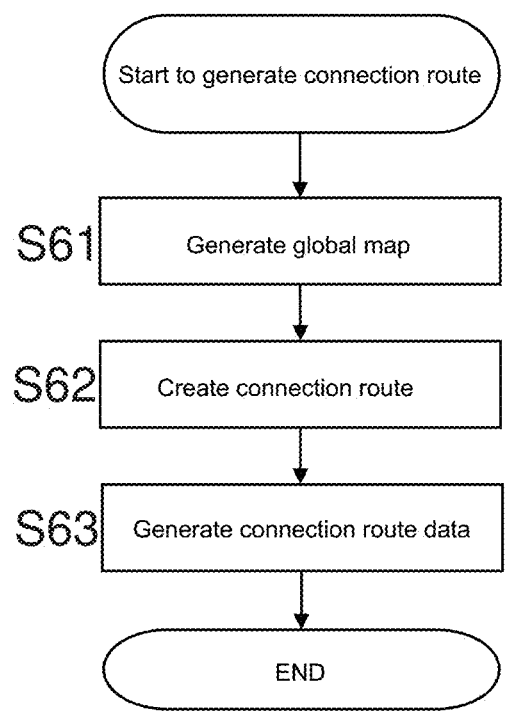

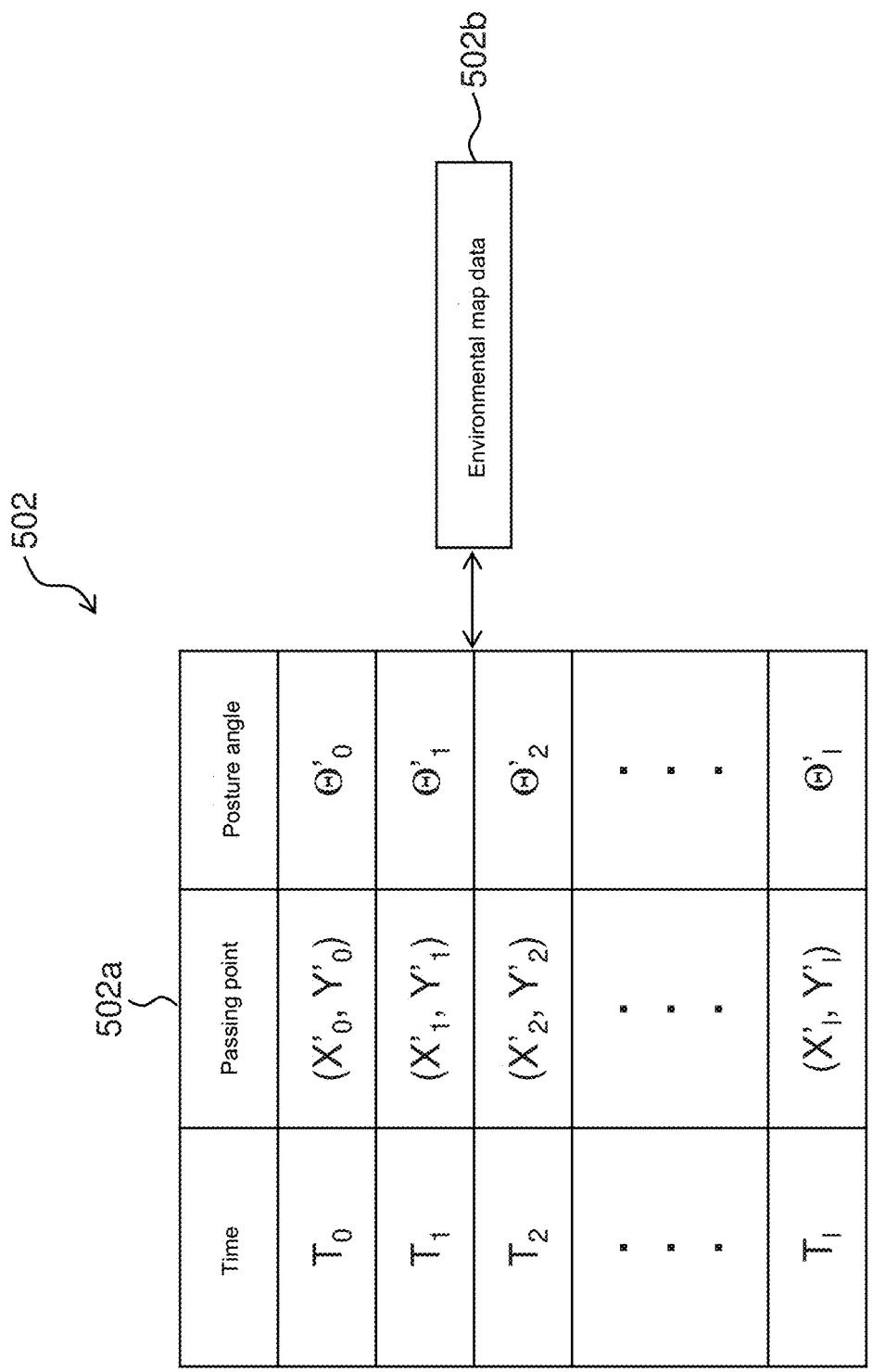
[FIG. 25]

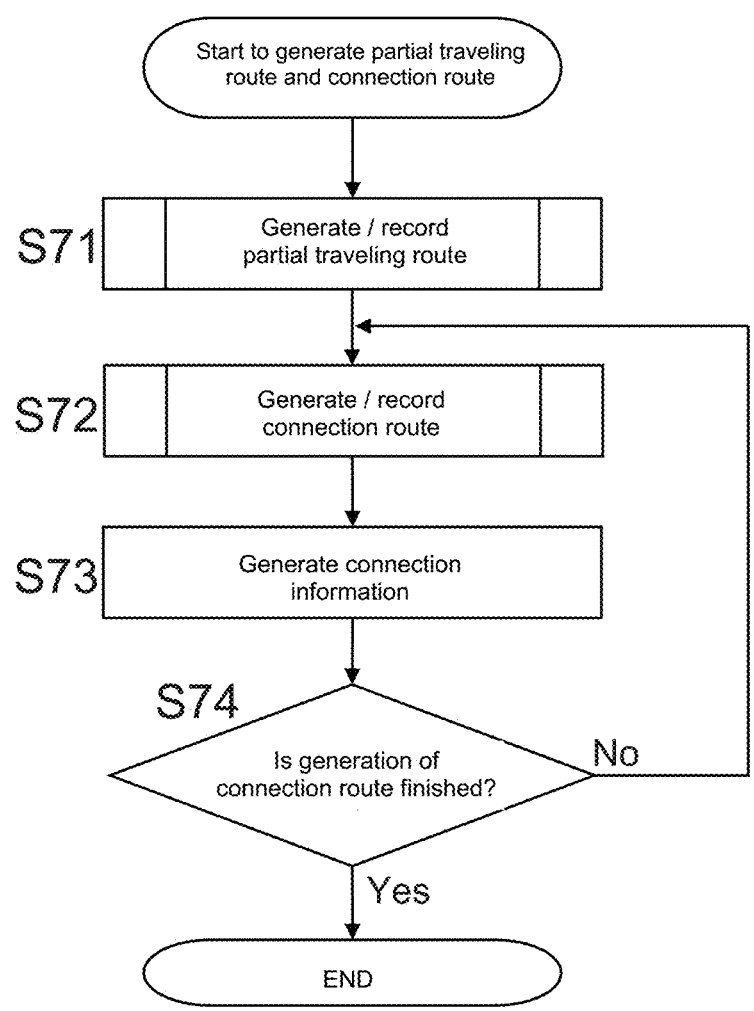
[FIG. 26]

AUTONOMOUSLY TRAVELING VEHICLE, CONTROL METHOD, AND PROGRAM

BACKGROUND OF THE INVENTION

1. Field of the Invention

The present invention relates to an autonomously traveling vehicle that autonomously travels on indicated autonomous travel route, a control method of the autonomously traveling vehicle and a non-transitory computer-readable medium including a program to execute the control method.

2. Description of the Related Art

An autonomously traveling vehicle which autonomously travels on the autonomous travel route indicated within a predetermined area is conventionally known. For example, a known autonomously traveling vehicle records a travel route, within a predetermined area, which is taught by a user as an autonomous travel route and autonomously travels on the recorded autonomous travel route (for example, refer to Japanese Patent No. 6136543).

Another known autonomously traveling vehicle generates an autonomous travel route so as to 'paint out' a specific area within a predetermined area and reproduces the autonomous travel route faithfully (refer to International Unexamined Patent Publication No. WO2018/043180).

The above autonomously traveling vehicle compares map information (which is called a global map) showing the above predetermined area to map information (which is called a local map) around an autonomously traveling vehicle obtained by using the distance measuring sensor to estimate the self-position within a predetermined area, and travels such that the estimated self-position complies with a target passing point on an autonomous travel route, realizing the autonomously travel.

SUMMARY OF THE INVENTION

In general, estimation of a self-position and acquisition of a local map are repeated while an autonomously traveling vehicle travels according to user operation, and then, the local map corresponding to each estimated self-position is disposed, so that a global map of the above autonomously traveling vehicle is generated.

The global map obtained in this method may not faithfully represent the entire area when an area to be represented in the global map becomes large. This method causes a larger positional displacement between the self-position estimated in accordance with traveling of the autonomously traveling vehicle and the actual position, so that the local map cannot be arranged at the correct position.

According to Japanese Patent No. 6136543, a passing time (or a self-position) of each passing point during travel by user teaching and map information (local map) obtained at each of the passing points are associated with each other and recorded, and the global map is reproduced by using the recorded map information during an autonomous traveling. This prevents an incorrect global map from being generated by accumulation of self-position estimation errors which occurs during the travel by user teaching.

In the autonomously traveling vehicle using this global map producing method, it is considered that travel routes are generated for respective small areas included in a large area and then the travel routes are linked together each other to generate an autonomous travel route over the large area. This autonomously traveling vehicle generates the travel routes for respective small areas, each of which is generated on each different coordinate (on a different global map), so that information on positional relationships between travel routes is lost. This information loss does not allow for linkage between the coordinate points included in the travel routes, preventing generation of the autonomous travel route over the large area. Therefore, instead of this coordinate point linking method, the technique to link the travel routes each other is required.

According to preferred embodiments of the present invention, travel routes generated on different coordinates are linked to each other to create an autonomous travel route.

Hereinafter, a plurality of aspects of preferred embodiments of the present invention will be described. Combinations of these aspects are included in preferred embodiments of the present invention.

An autonomously traveling vehicle according to an aspect of a preferred embodiment of the present invention is a vehicle which autonomously travels on an autonomous travel route designated in a predetermined area. The autonomously traveling vehicle includes a main body, a storage, an autonomous travel plan generator and a traveling controller. The main body includes a travel carriage. The storage stores partial traveling routes and connection routes. The partial traveling route is a travel route generated for each of a plurality of subareas. Each subarea is a portion of the predetermined area, each of which includes an individual coordinate system. The connection route is a travel route connecting the partial traveling routes.

The autonomous travel plan generator generates an autonomous traveling schedule by linking the selected partial traveling routes with the connection routes selected to connect the selected partial traveling routes. The traveling controller controls the travel carriage based on the autonomous traveling schedule to move the main body.

The autonomous travel plan generator of the autonomously traveling vehicle generates the autonomous traveling schedule by linking a plurality of partial traveling routes generated on different coordinates to connection routes, respectively. The autonomous travel plan generator does not generate the route connecting coordinate points included in two partial traveling routes as the connection route. The autonomous travel plan generator generates the autonomous traveling schedule as information showing which connection route connects two partial traveling routes.

This enables the autonomous travel plan generator to connect the plurality of partial traveling routes generated on different coordinates respectively so as to create the autonomous travel route that allows for an autonomous travel in the large area.

The storage may store connection information. The connection information is information in which the connection routes and the partial traveling routes to be connected by the connection routes are associated with each other and recorded. In this case, the autonomous travel plan generator selects the connection routes to connect a plurality of the selected partial traveling routes based on the connection information.

This enables the autonomous travel plan generator to easily find appropriate connection routes for any combination of the partial traveling routes.

The connection route may include map information. The map information shows a status of surroundings of the connection route in the predetermined area. This enables the autonomously traveling vehicle to travel along the connection route while estimating the self-position by use of this map information.

The map information may include reproduction map information which shows surroundings of each passing point of the connection routes. This enables the autonomously traveling vehicle to accurately generate the map information used for self-position estimation.

The autonomously traveling vehicle may further include an error notifier to provide notification of an error that a continuous autonomous travel route cannot be generated with the selected partial traveling route when there is no connection route corresponding to at least a portion of the plurality of selected partial traveling routes.

A control method according to another aspect of a preferred embodiment of the present invention is a method to control the autonomously traveling vehicle which includes the main body including the traveling carriage and autonomously travels on the autonomous travel route instructed within the predetermined area. The method includes generating partial traveling routes for each of a plurality of subareas, each subarea being a portion of the predetermined area, and including an individual coordinate system; generating connection routes that connect the partial traveling routes; generating an autonomous traveling schedule by associating selected partial traveling routes with the connection routes selected to connect the selected partial traveling routes; and moving the main body by controlling the travel carriage in accordance with the autonomous traveling schedule.

In the above method to control the autonomously traveling vehicle, the autonomous traveling schedule is made by linking a plurality of the partial traveling routes to the connection routes generated on different coordinates, respectively. Instead of generating the route connecting the coordinate points included in two partial traveling routes as the connection route, the autonomous traveling schedule is caused to show information of which connection route is to be connected with two partial traveling routes.

This makes it possible to connect a plurality of the partial traveling routes generated on different coordinates, respectively, and to create the autonomous travel route that allows for an autonomous travel over a large area.

A non-transitory computer-readable medium including a program according to another aspect of a preferred embodiment of the present invention allows the computer to execute the above method.

A plurality of the partial traveling routes generated on different coordinates respectively are connected, so that the autonomous traveling route that allows for an autonomous travel on a large area can be provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a diagram illustrating an overall configuration of an autonomously traveling vehicle.

FIG. 2 is a diagram illustrating an overall configuration of a controller.

FIG. 3 is a diagram illustrating an overall configuration of a central controller.

FIG. 4 is a flowchart illustrating an outline operation of an autonomously traveling vehicle.

FIG. 5 is a diagram schematically illustrating an example of teaching of a partial traveling route and a connection route.

FIG. 6 is a flowchart of a generating operation of a partial traveling route and a connection route according to a first preferred embodiment of the present invention.

FIG. 7 is a diagram illustrating an example of a data structure of connection information.

FIG. 8 is a flowchart of a generating operation of a partial traveling route for copy travel.

FIG. 9A is a diagram illustrating an example of a first teaching graphical user interface.

FIG. 9B is a diagram illustrating an example of a second teaching graphical user interface.

FIG. 9C is a diagram illustrating an example of a third teaching graphical user interface.

FIG. 9D is a diagram illustrating an example of a fourth teaching graphical user interface.

FIG. 9E is a diagram illustrating an example of an alert.

FIG. 9F is a diagram illustrating an example of a fifth teaching graphical user interface.

FIG. 9G is a diagram illustrating an example of a sixth teaching graphical user interface for teaching.

FIG. 9H is a diagram illustrating an example of an edit graphical user interface.

FIG. 10 is a diagram illustrating an example of a data structure of a partial traveling route data for copy travel.

FIG. 11 is a flowchart of generating operation of a paint-out partial traveling route.

FIG. 12 is a diagram illustrating an example when an subarea is converted into a number of collection of cells.

FIG. 13 is a diagram illustrating an example of a score given to each cell of subarea.

FIG. 14 is a diagram illustrating an example of a partial traveling route for paint-out travel.

FIG. 15 is a diagram illustrating an example of a data structure of a partial traveling route data for paint-out travel.

FIG. 16 is a flowchart of creating an operation of an autonomous travel route.

FIG. 17 is a diagram illustrating an example of an user interface for selection.

FIG. 18 is a diagram illustrating an example of an autonomous traveling schedule.

FIG. 19 is a diagram illustrating an example of a user interface for selection displaying an identification of a selected partial traveling route.

FIG. 20 is a diagram illustrating an example of a user interface for selection displaying only a selected partial traveling route.

FIG. 21A is a drawing illustrating an example of a display when selecting a partial traveling route.

FIG. 21B is a drawing illustrating an example of a display just after selecting a partial traveling route.

FIG. 21C is a drawing illustrating an example of an animation displaying that partial traveling routes are rearranged in a selection order.

FIG. 21D is a drawing illustrating an example of the screen image displayed after partial traveling routes are redisplayed in a selection order.

FIG. 22 is a flowchart illustrating an autonomous traveling operation.

FIG. 23A is a diagram illustrating an example of a user interface for a first autonomous travel.

FIG. 23B is a diagram illustrating an example of a user interface for a second autonomous travel.

FIG. 24 is a flowchart illustrating a method for generating a connection route according to the second preferred embodiment of the present invention.

FIG. 25 is a diagram illustrating an example of a data structure of a connection route data generated in the second preferred embodiment of the present invention.

FIG. 26 is a flowchart illustrating a method for generating a partial traveling route and a connection route according to a third preferred embodiment of the present invention.

DETAILED DESCRIPTION OF THE PREFERRED EMBODIMENTS

1. First Preferred Embodiment

Hereinafter, an autonomously traveling vehicle 100 according to a first preferred embodiment of the present invention will be described. With reference to FIG. 1, the overall configuration of the autonomously traveling vehicle 100 will be described. FIG. 1 is a diagram showing the overall configuration of the autonomously traveling vehicle. The autonomously traveling vehicle 100 according to the present preferred embodiment autonomously reproduces cleaning conditions set at each passing point of the autonomous travel route while autonomously traveling on the instructed travel route (autonomous travel route) within a predetermined area (e.g., indoors such as within buildings). The autonomously traveling vehicle 100 is provided mainly with a main body B, a traveling carriage 1, a scrubber 3 and a controller 5.

The main body B is a main body of the autonomously traveling vehicle 100. A forward sensor 21a is arranged at front side of the main body B in a traveling direction and a backward sensor 21b is arranged at back side of the main body B in a traveling direction. The forward sensor 21a and the backward sensor 21b obtain information on obstacles such as a wall existing around the autonomously traveling vehicle 100 (main body B).

Each of the forward sensor 21a and the backward sensor 21b are, for example, a Laser Range Finder (LRF) of which a detection range is 180 degrees or more. By using the Laser Range Finder as the forward sensor 21a and the backward sensor 21b, the distance between the traveling carriage 1 and an obstacle and the direction in which the obstacle exists are obtained as obstacle information.

Information obtained by the forward sensor 21a and the backward sensor 21b may be two-dimensional information that shows the position where any obstacle exists on a predetermined plain surface, and further may be three-dimensional information including information showing the position where any obstacle exists in a height direction.

The detection range (detection angle and/or detection distance) of the forward sensor 21a may be wider than the detection range of the backward sensor 21b. In this way, the information on any obstacle existing in a wider range in front of the autonomously traveling vehicle 100 can be obtained. Alternatively, the forward sensor 21a and the backward sensor 21b may be replaced with TOF (Time-of-Flight) cameras.

The traveling carriage 1 provided on the main body B causes the autonomously traveling vehicle 100 travel. The traveling carriage 1 includes a pair of wheel motors 11 and main wheels 13, each of which is provided at each of the bottom left and right edges of the main body B. The main wheel 13 is attached to an output rotary shaft of the wheel motor 11 and rotates in accordance with rotation of the wheel motor 11.

According to another preferred embodiment of the present invention, a traveling carriage 1, for example, may include auxiliary wheels 15 so as to allow an autonomously traveling vehicle 100 to travel more stably. The auxiliary wheels 15 may be rotatably attached behind the main wheel 13 at the bottom left and right edges of a main body B. In view of a position of the center of gravity of an autonomously traveling vehicle 100, the auxiliary wheel 15 may be attached in front of the main wheel 13.

A scrubber 3, which may be arranged at the bottom of the main body B, is able to clean a floor F according to the predetermined cleaning conditions. The scrubber 3 according to the present preferred embodiment is able to perform a cleaning operation by brushing the floor F with a washing liquid. The scrubber 3 includes preferably, a washing liquid discharge port 31, a squeegee 33, and a washing head 35. The washing liquid discharge port 31 discharges the washing liquid such as water, supplied through a washing liquid supply pump 31b from a washing liquid supply tank 31a, to the floor F in front of the main body B. The squeegee 33 arranged at the rear bottom of the main body B collects the washing liquid remaining on the floor F. The washing head 35 arranged at the front bottom of the main body B cleans the floor F by rotating on the floor F where the washing liquid exists through rotation of a washing head motor 35a.

According to another preferred embodiment, a suction port 02 connecting to a collecting section 33b may be provided at the squeegee 33. The inside of the collecting section 33b becomes in a negative pressure state with a suction motor 33a, allowing the suction port 02 to absorb the washing liquid and dust collected by the squeegee 33 and to send to the collecting section 33b.

The autonomously traveling vehicle 100 includes the controller 5, which is a computer system including a CPU, a storage (such as RAM, ROM, hard disc drive or SSD), and various interfaces. The controller 5 performs various controls with respect to the autonomously traveling vehicle 100. The structure of the controller 5 will be described in detail later.

The autonomously traveling vehicle 100 according to the present preferred embodiment of the present invention has a function to reproduce an autonomously travel taught by a user operation and a function to autonomously travel so as to 'paint out' the specific area indicated by a user operation. Hereinafter, the function to reproduce a route traveling taught by the user operation is called a 'copy travel function' and the function to autonomously travel so as to 'paint out' the specific area indicated by a user operation is called 'paint-out travel function'.

In order to perform the above functions, the autonomously traveling vehicle 100 includes a teaching unit 7 for a travel route (hereafter refer to teaching unit 7), which is a device to receive a user instruction on the movement operation of traveling carriage 1. The teaching unit 7 is attached to the upper backside of the main body B with an attachment 8. The teaching unit 7 is an operating device including, for example, a pair of rotatable handles. By using the steering handles or a handle bar of the teaching unit 7, a user controls rotation amount of a pair of the main wheel 13 to steer the autonomously traveling vehicle 100.

According to another preferred embodiment of the present invention, a teaching unit 7, for example, may be a remote controller such as a joystick that operates the autonomously traveling vehicle 100 remotely. Further, the autonomously traveling vehicle 100 may be able to be operated by both of the above teaching unit 7 attached to a main body B and the remote controller.

The autonomously traveling vehicle 100 also includes an operation setting unit 9, which defines and functions as an operation panel to perform various setting operations for the autonomously traveling vehicle 100. The operation setting unit 9 is, for example, a touch panel with a display.

As will later be described, using partial traveling routes selected from the partial traveling routes stored in a storage 57 (to be described later) and connection routes connecting these partial traveling routes, the autonomously traveling vehicle 100 according to the present preferred embodiment creates the travel route (autonomous travel route) on which the autonomously traveling vehicle 100 autonomously travels. Since the operation setting unit 9 has a function to select partial traveling routes used for creation of the autonomous travel route, with the operation setting unit, the user can set whether or not the autonomous travel route is created through connecting which the partial traveling routes in which order.

The operation setting unit 9 also is also able to set the controlled variable of the scrubber 3. In detail, the user can set a discharge amount of washing liquid from the washing liquid discharge port 31, the number of rotations of the washing head motor 35a and the suction force of washing liquid from the suction port 02 as cleaning conditions using the operation setting unit 9.

The operation setting unit 9 is arranged in the vicinity of the teaching unit 7 in the main body B, so that the user can operate the operation setting unit 9 while operating the teaching unit 7. The user can clean floor F while the autonomously traveling vehicle 100 is traveling.

As with the above teaching unit 7, the operation setting unit 9 may be attached separately from the main body B. The operation setting unit 9 includes a radio-communicable console such as a portable terminal. The teaching unit 7 and the operation setting unit 9 may be integrated so as to operate the traveling carriage 1 and the scrubber 3 easily at the same time.

Hereinafter, with reference to FIGS. 1 and 2, the overall configuration of the controller 5 will be described. FIG. 2 is a diagram showing the overall configuration of the controller. For example, all or part of each functional block of the controller 5 may be configured by the program stored in a storage and/or a storage device of the computer system and also configured as a custom IC such as a SoC (System on Chip).

The controller 5 may be provided with a computer system or a plurality of computer systems. In the controller 5 including a plurality of computer systems, for example, a plurality of the functional blocks of the controller 5 are allocated to the plurality of computer systems at any rate and performed.

The controller 5 is configured or programmed to include a traveling controller 51, a cleaning controller 53, a central controller 55 and a storage 57.

The traveling controller 51 controls the wheel motors 11. In details, the traveling controller 51 operates the wheel motor 11 based on a user operation by the teaching unit 7 or based on a reproductive traveling control instruction from the central controller 55. The mode in which the traveling controller 51 controls the wheel motors 11 based on the operation performed by the teaching unit 7 is called 'manual operation mode' and the mode in which the traveling controller 51 controls the wheel motors 11 based on the reproductive traveling control instruction is called 'autonomous traveling mode'. The manual operation mode includes a 'teaching traveling mode' to teach the desired autonomous travel route and a 'simple manual operation mode' without any teaching. The simple manual operation mode is used, for example, to move the autonomously traveling vehicle 100 to the starting position of reproductive traveling.

These modes are switchable in the traveling controller 51 based on an instruction from outside (for example, the teaching unit 7 or the operation setting unit 9).

The traveling controller 51 calculates the target rotational speed of the wheel motors 11 based on an operation amount of the steering handle or the handle bar of the teaching unit 7 or the reproductive traveling control instruction. The traveling controller 51 performs control so that the wheel motors 11 will rotate at the target rotational speed by outputting drive power to the wheel motors 11 based on a difference between the actual rotational speed and the target rotational speed of the wheel motor 11. The actual rotational speed of the wheel motor 11 is able to be calculated based on a pulse signal from an encoder 17 attached to the output rotational shaft of the wheel motor 11.

The above control can be performed by use of a control theory such as a PI (Proportional Integral) or a PID (Proportional Integral Differential).

According to the present preferred embodiment, the wheel motor 11 and the main wheel 13 are arranged at each of left and right edges of the bottom of the main body B. The traveling controller 51 determines the traveling direction of the autonomously traveling vehicle 100 by controlling independently the rotational speed and the direction of respective right and left wheel motors 11.

When the user operation is required for the autonomously traveling vehicle 100 to clean the floor, the cleaning controller 53 outputs a signal to control the rotation speeds or outputs of the washing head motor 35a, the washing liquid supply pump 31b and the suction motor 33a according to the teaching cleaning conditions received from the operation setting unit 9.

In the autonomous travel mode that does not require a cleaning operation by a user, the cleaning controller 53 receives the setting values of cleaning conditions in an autonomous traveling mode from the central controller 55 to control the scrubber 3 according to the setting value of cleaning conditions, so that the autonomously traveling vehicle 100 cleans the floor F autonomously.

The central controller 55 which organizes all controls of the autonomously traveling vehicle 100 estimates where the autonomously traveling vehicle 100 is moving on the floor F based on the data obtained from the forward sensor 21a, the backward sensor 21b and/or the encoder 17, and creates the information showing the self-position.

The central controller 55 creates the autonomous travel route for the autonomously traveling vehicle 100 to travel autonomously. The details will be described, however, the central controller 55 links a plurality of the partial traveling routes to the connection route connecting the plurality of partial traveling routes to make an autonomous traveling schedule 500.

The partial traveling route is generated within a subarea RA that is a part of the predetermined area A. The partial traveling route includes the partial traveling route for copy travel and the partial traveling route for paint-out travel as described above. The details of a method of generating these partial traveling routes will be described later.

Further, in the autonomous traveling mode, the central controller 55 calculates the reproductive traveling control instruction based on the data stored in the autonomous traveling schedule 500 and output to the traveling controller 51. In the autonomous travel mode, the central controller 55 calculates the setting values of cleaning conditions based on the cleaning conditions stored in the autonomous traveling schedule 500 and outputs them to the cleaning controller 53.

The storage 57 includes a part or all of the storing areas of storage device of computer system included in the controller 5 records various information on the autonomously traveling vehicle 100. In detail, the storage 57 records various settings of an autonomously traveling vehicle 100 or the data on the travel route generated by the central controller 55.

The storage 57 records the above autonomous traveling schedule 500, the data on the partial traveling route included in the autonomous traveling schedule 500 (partial traveling route data 501), the data on the connection route connecting partial traveling routes (connection route data 502) and the connection information 503 showing the relationships between the partial traveling routes and the connection routes as the data on travel route.

According to another preferred embodiment of the present invention, a controller 5 may include a data writing device (not illustrated) to record the data stored in a storage 57 into another storage medium, and also may include a connection terminal connectable to the data writing device such as a USB port. The device or terminal enables the controller 5 to record the data stored in the storage 57 into another storage medium or to record the data stored in another storage medium into the storage 57. For example, the partial traveling route data 501 generated by an external computer is able to be recorded into the storage 57.

Hereinafter, with reference to FIG. 3, the detailed configuration of the central controller 55 will be described. FIG. 3 is a diagram showing a configuration of the central controller. The central controller 55 is configured or programmed to estimate a self-position, generate various travel routes, and provide information on the autonomous traveling schedule 500. In detail, the central controller 55 is configured or programmed to include a self-position estimation unit 55a, a partial traveling route generation unit 55b, an autonomous travel plan generator 55c, and a travel reproduction unit 55d.

The self-position estimation unit 55a generates map information showing any obstacles existing around the autonomously traveling vehicle 100 as well as estimates a self-position of the autonomously traveling vehicle 100 using the map information.

Using the information on any obstacles existing in front of the autonomously traveling vehicle 100 obtained by the forward sensor 21a and the information on any obstacles existing behind the autonomously traveling vehicle 100 obtained by the backward sensor, and as needed, converting a coordinate, the self-position estimation unit 55a generates map information. The map information generated in this way shows the surroundings of current self-position. Therefore, the map information is referred to as a 'local map'.

Further, the self-position estimation unit 55a estimates a self-position of the autonomously traveling vehicle 100 based on a rotation amount of the wheel motors 11 obtained by the encoder 17 and a map-matching result between a generated local map and map information (which is called, 'global map' or 'environmental map') showing the area in which the autonomously traveling vehicle 100 is traveling.

The partial traveling route generation unit 55b generates the partial traveling route data 501 and the route connection data 502. In order to generate the partial traveling route data 501 to perform the above 'copy travel function', the partial traveling route generation unit 55b records traveling (and cleaning) of the autonomously traveling vehicle 100 operated by a user as the partial traveling route data 501.

In order to generate the partial traveling route data 501 to perform the above 'paint-out travel function', the partial traveling route generation unit 55b generates the travel route to be painted out within the specific area (subarea RA) indicated by a user with a prescribed algorithm, and records this as the partial traveling route data 501.

The autonomous travel plan generator 55c creates the autonomous travel route where the autonomously traveling vehicle 100 travels autonomously. In detail, the autonomous travel plan generator 55c makes the autonomous traveling schedule 500 using the partial traveling route data 501 selected with the operation setting unit 9 and the route connection data 502 for a connection of the selected partial traveling routes.

In detail, the autonomous travel plan generator 55c links the selected partial traveling route data 501 to the route connection data 502 connecting these partial traveling routes to make the autonomous traveling schedule 500. The detailed method of generating the autonomous traveling schedule 500 will be described later.

In the autonomous traveling mode, the traveling reproduction unit 55d calculates control instruction (which is called "reproductive traveling control instruction") for the autonomous traveling of the autonomously traveling vehicle 100 based on the information stored in the autonomous traveling schedule 500 and the self-position of the autonomously traveling vehicle 100 estimated by the self-position estimation unit 55a, and outputs this reproductive traveling control instruction to the traveling controller 51.

In addition, the traveling reproduction unit 55d outputs the autonomous traveling schedule 500, the partial traveling route data 501 included in the autonomous traveling schedule 500, or the cleaning conditions (if recorded) of the route connection data 502 to the cleaning controller 53.

With reference to FIG. 4, which is a flowchart showing the outline of the operation control routine of the autonomously traveling vehicle 100, an exemplary control operation is explained below such that the controller 5 (the central controller 55) generates the autonomous traveling schedule 500 by which the traveling vehicle 100 can travel and clean autonomously. In step S1, a user can set the operation mode of the autonomously traveling vehicle 100 to the teaching travel mode out of the manual operation mode and then operate the traveling vehicle 100 to travel, thus the partial traveling route generation unit 55b can generate the partial traveling routes and the connection routes and store them in the storage 57. Further, the partial traveling route generation unit 55b can record each of the connection routes and the partial traveling routes in the connection information 503 so that the respective connection routes can be associated with the connected partial traveling routes.

The operation mode is switched into the autonomous traveling mode and then, the autonomous travel plan generator 55c creates autonomous travel routes at step S2 as follows. The autonomous travel plan generator 55c receives the selection of the partial traveling route in the operation setting unit 9 and associates the partial traveling route data 501 of the selected partial traveling route, out of the partial traveling route data 501 stored in the storage 57, with the route connection data 502 of the connection route connecting to the partial traveling route and then, makes the autonomous traveling schedule 500.

In step S3, the traveling reproduction unit 55d generates the reproductive traveling control instruction according to the autonomous traveling schedule 500 made in step S2 and outputs it to the traveling controller 51. When cleaning conditions are included in the autonomous traveling schedule 500, the traveling reproduction unit 55d outputs the corresponding cleaning conditions to the cleaning controller 53 in the timing indicated in the autonomous traveling schedule 500.

Hereinafter, with reference to FIGS. 5 and 6, the generating operation of partial traveling routes and connection routes performed in the above step S1 will be described. FIG. 5 is a diagram schematically showing an example of instructions of partial traveling routes and connection routes. FIG. 6 is a flowchart showing generating operation of partial traveling routes and connection routes according to the first preferred embodiment of the present invention. Hereinafter, as described FIG. 5, an example of teaching showing four partial traveling routes PR1 to PR4 and four connection routes CR (1, 2), CR (2, 3), CR (3, 4) and CR (4, 1) within the predetermined area A will be described.

As shown in FIG. 5, the partial traveling route PR1 is a route generated in the subarea RA1. The copy travel is appropriate for the subarea RA1 in which an obstacle exists. Therefore, the partial traveling route PR1 is generated as a partial traveling route for the copy travel. The partial traveling route PR2 is a boundary of so large subarea RA2 that the paint-out travel is appropriate for the subarea RA2. Therefore, the partial traveling route is generated within the subarea RA2 for the paint-out travel.

The partial traveling route PR 3 is a route generated in the subarea RA3. The subarea RA3 is such a small area that the partial traveling route PR 3 is generated as the partial traveling route for the copy travel. The partial traveling route PR 4 is a route generated in the subarea RA4. The subarea RA4 is such a small area that the partial traveling route PR 4 is generated as the partial traveling route for the copy travel.

As shown in FIG. 5, the end point of the partial traveling route PR1 connects to the starting point of the partial traveling route PR 2 with the connection route CR (1, 2), and the end point of the partial traveling route PR 2 connects to the starting point of the partial traveling route PR 3 with the connection route CR (2, 3). The end point of the partial traveling route PR 3 connects to the starting point of the partial traveling route PR 4 with the connection route CR (3, 4) and the end point of the partial traveling route PR 4 connects to the starting point of the partial traveling route PR 1 with the connection route CR (4, 1).

The partial traveling routes and connection routes are taught in the following order: the partial traveling route PR 1, the connection route CR (1, 2), the partial traveling route PR 2, the connection route CR (2, 3), the partial traveling route PR 3, the connection route CR (3, 4), the partial traveling route PR 4, and the connection route CR (4, 1).

With reference to FIG. 6, a generating operation of connection route will be described. In step S11, the partial traveling route generation unit 55b generates the partial traveling route data 501 of the partial traveling route PR1 and records it in the storage 57. When performing generation and recording of the partial traveling route, a user informs the controller 5 (the central controller 55) of which a partial traveling route is generated at this time, with the operation setting unit 9.

When the autonomously traveling vehicle 100 reaches the end point of the partial traveling route PR1 which is being generated at present, in step S12, the partial traveling route generation unit 55b starts generating and recording the route connection data 502 of the connection route CR (1, 2) which has the end point of the partial traveling route PR1 of which generation has been finished as the starting point. The information that the autonomously traveling vehicle 100 has reached the end point of the partial traveling route PR1 being generated at present, is, for example, given to the controller 5 (the central controller 55) by a user with the operation setting unit 9. The information that the generation and storing of the route connection data 502 of the connection route CR (1, 2) will be starting may also be explicitly given by a user with the operation setting unit 9.

When any connection route corresponding to the partial traveling route generated in the above step S11 is not generated, in other words, when the teaching is finished at the end point of this partial traveling route, the partial traveling route generation unit 55b finish the teaching of partial traveling route and connection route without executing the following steps S12 to S14.

In the same manner as generating operation of the partial traveling route for the copy travel, as will later be described, the partial traveling route generation unit 55b generates the route connection data 502 according to user operation and stores it in the storage 57.

After the autonomously traveling vehicle 100 reaches at the end point of the connection route CR (1, 2), which is the starting point of the route PR 2 to be generated next, a user can inform the controller 5 (the central controller 55) of which a partial traveling route (the route PR2) is generated with the operation setting unit 9. Thus, generating the connection route CR (1, 2) is completed.

In another variant, a user may expressly instruct the autonomously traveling vehicle 100 to complete generating the route connection data 502 of the connection route CR (1, 2) and storing it in the storage with the operation setting unit 9, after that may expressly instruct which a partial traveling route (the route PR2) is to be generated next time.

In step S13, the partial traveling route generation unit 55b associate a first connection information, a second connection information, and a third connection information with each other to create a connection information 503. The first connection information relates the connection route CR (1, 2) that has been generated at Step S12, the second connection information relates a partial traveling route (partial traveling route PR1) that has been generated prior to generation of the connection route CR (1, 2) informed in step S11, and the third connection information relates the partial traveling sub-route (the route PR2) to be generated just after notifying when generation of the connection route (1, 2) is finished.

The first connection information on the connection route CR (1, 2) that has been generated, the second connection information on the partial traveling route which is a connection source of the connection route, and the third connection information on the partial traveling route of connection destination of the connection route are associated with each other and recorded as the connection information 503.

For example, the partial traveling route generation unit 55b associates information (for example, file name, ID number) identifying the route connection data 502 which is the connection information on the connection route that has been generated, information (for example, file name, ID number) identifying the partial traveling route data 501 of the partial traveling route of the connection source, and information (for example, file name, ID number) identifying the partial traveling route data 501 of the partial traveling route of the connection destination with each other, and generates the connection information 503.

Until the route PR2 and the partial traveling route PR3 and PR4 are generated after generating the connection information 503 at the stage prior to generating the connection route CR (1, 2), and generation of the connection routes CR (2, 3), CR (3, 4) and CR (4, 1), which connects them each other, has finished ('No' at step S14), the partial traveling route generation unit 55b executes repeatedly the above steps S11 to S13.

The connection information 503 is finally generated after the four partial traveling routes PR1 to PR 4 and the connection routes CR (1, 2), CR (2, 3), CR (3, 4), and CR (4, 1) connecting these partial traveling routes PR1 to PR4 as shown in FIG. 5 are generated. The connection information 503 has a data structure as shown in FIG. 7, which shows an example of a data structure of connection information.

FIG. 7 shows, for example, for the connection route CR (1, 2) having identification information as 'connection route #1', the connection source is 'partial traveling route #1' (the partial traveling route PR1) and the connection destination is 'route #2' (the route PR2). Accordingly, from this connection information 503, it can be understood that the starting point of the connection route CR (1, 2) is consistent with the end point of the partial traveling route PR1 and the end point of the connection route CR (1, 2) is consistent with the starting point of the route PR2.

It is also shown that for the connection route CR (2, 3) having identification information as 'connection route #2', the connection source is 'the route #2' (the route PR2) and the connection destination is 'the partial traveling route #3' (the partial traveling route PR3). Accordingly, it can be understood that the starting point of the connection route CR (2, 3) is consistent with the end point of the route PR2 and that the end point of the connection route CR (2, 3) is consistent with the starting point of the partial traveling route PR 3.

It is shown that for the connection route CR (3, 4) having identification information as 'connection route #3', the connection source is 'the partial traveling route #3' (the partial traveling route PR3) and the connection destination is 'the partial traveling route #4' (the partial traveling route PR4). Accordingly, it can be understood that the starting point of the connection route CR (3, 4) is consistent with the end point of the partial traveling route PR3 and that the end point of the connection route CR (3, 4) is consistent with the starting point of the partial traveling route PR 4.

It is shown that for the connection route CR (4, 1) having identification information as 'connection route #4', the connection source is 'the partial traveling route #4' (the partial traveling route PR4) and the connection destination is 'the partial traveling route #1' (the partial traveling route PR1). Accordingly, it can be understood that the starting point of the connection route CR (4, 1) is consistent with the end point of the partial traveling route PR4 and that the end point of the connection route CR (4, 1) is consistent with the starting point of the partial traveling route PR 1.

Hereinafter, generation of the partial traveling route executed in the above step S11 will be described in details. According to the present preferred embodiment of the present invention, the partial traveling route generation unit 55b is capable of generating the routes to realize the 'copy travel function' and the routes to realize the 'paint-out travel function' as partial traveling routes.

With reference to FIG. 8, a generating operation of the route to realize the copy travel function (partial traveling route for copy travel) will be described. FIG. 8 is a flowchart showing generating operation of the partial traveling route for the copy travel. The generation of the partial traveling route for copy travel can be realized by obtaining the routes on which the autonomously traveling vehicle 100 has traveled as dot sequences of a plurality of passing points through the operation of the traveling route teaching unit 7. In the present preferred embodiment of the present invention, the connection route is also generated in the same or similar way as the generating operation of the partial traveling route for the copy travel as described below.

The partial traveling route generation unit 55b indicates a user interface as shown in FIG. 9A (refer to as first teaching graphical user interface GUI1) on a display of the operation setting unit 9. FIG. 9A is a diagram illustrating an example of a first teaching graphical user interface.

The first teaching graphical user interface GUI1 is a user interface displaying a list of the partial traveling routes created and recorded until this time and includes a route display unit D1 to display names of recorded partial traveling routes (referred to as partial traveling route name) as a list. Out of items which are displayed in the route display unit D1, new partial traveling routes are generated and stored in the items which are blank, and the partial traveling routes are already stored in the items in which are the route names are described.

The blank item of the route display unit D is selected (for example, select by coinciding the blank item with a reverse-C-shaped display) and an enter button B1 is pressed, so that a user interface (referred to as a second teaching user interface GUI2) is displayed as shown in FIG. 9B. FIG. 9B is a diagram illustrating an example of the second teaching graphical user interface.

The second teaching graphical user interface GUI2 is a user interface for setting the partial traveling route name, and includes a route type selection unit D2 to select the travel routes for the copy travel or the paint-out travel routes, and a keyboard D3 to set the partial traveling route name.

The copy travel is selected as a type of the partial traveling route on the route type selection unit D2 of the second teaching graphical user interface GUI2, the partial traveling route name to be newly created is set by using the keyboard D3, and the enter button B2 is pressed, so that a user interface (referred to as a third teaching graphical user interface GUI3) as shown in FIG. 9C is displayed. FIG. 9C is a diagram showing an example of the third teaching graphical user interface.

By selecting the picture linking two points with a line on the route type selection unit D2, the copy travel is selected as a type of the partial traveling route.

The third teaching graphical user interface GUI3 is displayed when teaching the partial traveling route starts, and includes a teaching start button B3. When the teaching start button B3 is pressed, a user interface (a fourth teaching graphical user interface GUI4) as shown in FIG. 9D is displayed. FIG. 9D is a diagram showing an example of the fourth teaching graphical user interface.

While the fourth teaching graphical user interface GUI4 is displayed, a user moves the autonomously traveling vehicle to the start point of the new partial traveling route by using the traveling route teaching unit 7. When the autonomously traveling vehicle 100 is moved to the position appropriate for a start point of the partial traveling route, the third teaching graphical user interface GUI3 is re-displayed.

The above-described 'the position appropriate for a start point of the partial traveling route' is, for example, a position where a characteristic local map is able to be obtained and the self-position of the autonomously traveling vehicle 100 is able to be estimated correctly.

If the autonomously traveling vehicle 100 is not moved to the position appropriate for a start point of the partial traveling route, an alert WD will be displayed as shown in FIG. 9E. FIG. 9E is a diagram showing an example of the alert.

The autonomously traveling vehicle 100 is moved to the position appropriate for a start point of the partial traveling route and then the teaching start button B3 is pressed on the third teaching graphical user interface re-displayed, so that the partial traveling route teaching starts. When the teaching of the partial traveling route starts, a user interface (referred to as the fifth teaching graphical user interface GUI5) is displayed as shown in FIG. 9F. FIG. 9F is a diagram showing an example of the fifth teaching graphical user interface GUI5.

The fifth teaching user interface GUI5 is displayed while the partial traveling route is taught and includes an elapsed time display portion D4 showing an elapsed time from the start of teaching the partial traveling route, a pause button B4 for a temporary stop of teaching, and a stop button B5 for completion of teaching.

When the partial traveling route teaching starts, the partial traveling route generation unit 55b obtains self-position information from the self-position estimation unit 55a in a predetermined cycle (select 'yes' at step S22) while operating the autonomously traveling vehicle 100 with the traveling route teaching unit 7 (in step S21). The predetermined cycle is, for example, a control cycle of the controller 5.

The self-position information obtained in step S23, for example, is estimated with the self-position estimation unit 55a as follows. Note that, if a self-position is required not only for generating the partial traveling route for the copy travel but also for autonomous traveling, the self-position would be estimated as follows.

The self-position estimation unit 55a calculates the traveling distance from the time of previous estimation to the time of present estimation based on a rotation amount (a pulse quantity output from the encoder 17) of the main wheel 13 (the wheel motor 11) from the time of previous estimation to the time of present estimation, and adds the traveling distance to the self-position estimated previously so as to estimate a tentative self-position (self-position estimation with dead reckoning).

Next, the self-position estimation unit 55a temporarily places some candidates of self-position around the above tentative self-position, arranges the local map obtained at the present position on the positions corresponding to the above self-position candidates on global map, and performs a map matching between the local map and the global map. Then, the self-position estimation unit 55a estimates the self-position candidate with the highest degree of coincidence between the local map and the global map as the present position (the self-position estimation by map matching).

As will later be described, in order to generate a partial traveling route for the copy travel, each passing point of the partial traveling route (partially traveling schedule 501a (to be described later)) is associated with a corresponding environmental map reproducing data 501b (to be described later). In other words, the global map showing subareas may be generated by using the environmental map reproducing data 501b.

In such a case, the self-position estimation unit 55a performs self-position estimation with the global map generated by using the environmental map reproducing data 501b obtained before the time of previous estimation. In detail, the global map is generated by arranging, on the self-position estimated at previous estimation and each of self-positions within the predetermined range from said self-position, the environmental map reproducing data 501b obtained at the corresponding self-position.

In order to generate the partial traveling routes for the paint-out travel to be described later, one environmental map data 501d (to be described later) is associated with one partial traveling route (partially traveling schedule 501c (to be described later). That is, entire subareas may be shown with one environmental map data 501d. In such a case, the self-position estimation unit 55a performs self-position estimation by using the environmental map data 501d as the global map.

When the self-position estimation by the map matching between the local map and the global map is not easy, alternatively, the self-position estimation unit 55a may estimate a self-position by the above dead reckoning based on the rotation amount of the main wheel 13 from the previous estimation time to the present estimation time. For example, a case that the self-position estimation by the map matching is difficult includes a case that the local map and/or the global map are monotonous, a case that the local map is not allowed to be obtained due to traveling on a large area without any walls or obstacles, and so on.

After the current self-position is estimated as above, in step S24, the partial traveling route generation unit 55b associates the self-position estimated in step S23 with the time when the self-position information is obtained or estimated, makes the partially traveling schedule 501a, and records the partial traveling schedule 501a in the partial traveling route data 501.

In step S25, the partial traveling route generation unit 55b associates the local map obtained when the self-position is estimated with the time when the self-position is obtained as the environmental map reproducing data 501b (an example of the reproducing map information), and records them in the partial traveling route data 501.

The above steps S21 to S25 are executed repeatedly while the operation with the traveling route teaching unit 7 is continued or until a user presses the stop button B5 on the fifth teaching user interface GUI5 to instruct the completion of the teaching (select 'No' at step S26). Whereas, when no operation with the traveling route teaching unit 7 is performed for a predetermined time or when stop button B5 is pressed to instruct the completion of teaching (select 'Yes' at step S26), acquisition of position information and storage into the partial traveling schedule 501a will be stopped.

When teaching of the partial traveling route is finished, the fourth teaching user interface GUI4 is shown on the screen of the operation setting unit 9 and the completion operations of teaching of the partial traveling route are performed. When the completion operations of teaching of the partial traveling route are completed, a user interface as shown in FIG. 9G (referred to as a sixth teaching user interface GUI6) is displayed on the screen of the operation setting unit 9.

The sixth teaching user interface GUI6 displays the information on the partial traveling route the vehicle taught and includes a starting position display D5 to display map information around the start point of the partial traveling route, a route display D6 to display a list of partial traveling routes generated, and an edit button B6.

When the edit button B6 is pressed, a user interface as shown in FIG. 9H (referred to as an edit graphical user interface GUI7) is displayed on the screen of the operation setting unit 9. FIG. 9H is a diagram showing an example of an edit graphical user interface.

The edit graphical user interface GUI7 is a user interface for changing the name of the partial traveling route and for deleting the partial traveling route and includes a selection display D7 to display the partial traveling route name being selected at present, a keyboard D8 to change the partial traveling route name, a delete button B7 to delete the partial traveling route being selected, and an enter button B8 to fix the partial traveling route name after change.

When the delete button B7 of the edit graphical user interface GUI7 is pressed, the partial traveling route being displayed on the selection display D7 is deleted. When the partial traveling route name displayed on the selection display D7 is changed with the keyboard D8 and then the enter button B8 is pressed, the partial traveling route name being selected is changed.

The partial traveling route generation unit 55b is able to generate the partial traveling route data 501 having the data structure, for example, as shown in FIG. 10 by executing the above steps S21 to S26. FIG. 10 is a diagram showing an example of data structure of the partial traveling route for copy travel. The route connection data 502 according to the present preferred embodiment of the present invention also has a data structure similar to that in FIG. 10.

As shown in FIG. 10, the partial traveling schedule 501a of the partial traveling route data 501 for copy travel associates a plurality of times, the coordinate value of the passing point at each time (coordinate value of x-y coordinate), and posture angle θ with each other and recorded them. Moreover, each time (coordinate value) of the partial traveling schedule 501a is associated with the environmental map reproducing data 501b obtained at the corresponding time.

After a cleaning operation is performed with the autonomously traveling vehicle 100 on the instructed partial traveling route, the partial traveling route generation unit 55b may obtain the cleaning conditions set at each passing point of the partial traveling route from the cleaning controller 53, may associate the obtained cleaning condition with the corresponding passing point (time) of the partial traveling schedule 501a, and may store it. This enables the cleaning operations performed at subareas to be stored in the partial traveling route data. Thus, the autonomously traveling vehicle 100 is capable of autonomously cleaning the subareas in the autonomous traveling mode.

With reference to FIGS. 11 to 14, generating operation of partial traveling routes for paint-out travel will be described. FIG. 11 is a flowchart showing generating operations of partial traveling routes for paint-out travel. FIG. 12 is a diagram showing an example in a case where subarea is divided into multiple cell aggregates. FIG. 13 is a diagram showing an example of scores given to each cell of the subarea. FIG. 14 is a diagram showing an example of partial traveling route for paint-out travel.

Hereinafter, by showing an example of generation of partial traveling routes for paint-out travel on the subarea RA2 of which boundary is the route PR2 shown in FIG. 5, the generating operation of the partial traveling routes will be described.

A user operates the traveling route teaching unit 7 to teach the boundary lines of the subarea RA2 for paint-out travel. The generating operation of the partial traveling route for paint-out travel is realized by the partial traveling route generation unit 55b generating partial traveling route data 501 for paint-out travel within the subarea RA2.

Similar to the generating operation of the partial traveling route for copy travel, the partial traveling route generation unit 55b displays the first teaching user interface GUI1 on the screen of the operation setting unit 9. In the first teaching user interface GUI1, the blank item of the route display D1 is selected and the enter button is pressed, so that the second teaching user interface GUI2 is displayed on the screen of the operation setting unit 9.

In the route type selection unit D2 of the second teaching user interface GUI2, the paint-out travel is selected as a type of the partial traveling route, the name of the partial traveling route to be created newly is input with the keyboard D3, and the enter button B2 is pressed, so that the third teaching user interface GUI3 is displayed on the screen of the operation setting unit 9.

In the route type selection unit D2, the paint-out travel is selected as a type of the partial traveling routes by selecting the hatched square.

In the third teaching user interface GUI3, the teaching start button B3 is pressed, so that the fourth teaching user interface GUI4 is displayed on the screen of the operation setting unit 9. While the user interface GUI4 is displayed, a user moves the autonomously traveling vehicle 100 to the start point of the boundary line of subarea RA.

When the autonomously traveling vehicle 100 is moved to the appropriate start position of the boundary line of the subarea RA, the third teaching user interface GUI3 is re-displayed. Pressing the teaching start button B3 causes the teaching operation of the boundary line of subarea RA to start. During this teaching operation, the fifth teaching user interface GUI5 is displayed on the screen of the operation setting unit 9.

When a teaching of boundary line of the subarea RA2 starts, at step S31, a user operates the traveling route teaching unit 7 to cause the autonomously traveling vehicle to travel along the boundary line of the subarea RA2. The partial traveling route generation unit 55b obtains the information on the boundary line of the subarea RA2 by obtaining the information of self-position during traveling which is estimated with the self-position estimation unit in a predetermined cycle and recording it as a sequence of points. Alternatively, the boundary line of the subarea RA may be created by using CAD.

The partial traveling route generation unit 55b arranges the local map obtained when the route PR2 is generated into the corresponding self-position in the route PR2 to generate the environmental map information 501d showing the area including the subarea RA2. The partial traveling route generation unit 55b records the generated environmental map information 501d in the partial traveling route data 501. When the partial traveling route for the paint out travel is generated, the entire area including the subarea RA2 is shown as an environmental map information 501d.

Moreover, the boundary line of the subarea RA2 (the route PR2) is a closed loop, however, the starting point and the end point of the boundary line, which should coincide with each other, may be significantly mismatched. In this case, the partial traveling route generation unit 55b may modify the boundary line of the generated subarea RA2 and the environmental map information 501d using a traveling route modification algorithm such as GraphSLAM so that the starting point and the end point will substantially coincide with each other.

After obtaining the boundary line of the subarea RA2, at step S32, the partial traveling route generation unit 55b converts the subarea RA2 defined by this boundary line into an aggregation of a number of cells C. The cell C corresponds to a small area having the predetermined size within the subarea RA2. In the procedure of the partial traveling route generation unit 55b, each cell C is defined as a 'structure' including, for example, a parameter relating to the cell C (such as a parameter to identify cell C, position information of cell C, validity or invalidity of cell C, scores given to cell C). For example, as shown in FIG. 12, the subarea RA2 is converted into an aggregation of a number of the cells C.

At step S33, the partial traveling route generation unit 55*b* gives a score to each of cells included in the subarea RA. Specifically, the partial traveling route generation unit 55*b* gives an equivalent score to the cells which are aligned in a main direction (a longitudinal direction) of a rectangular subarea RA, and gives the larger scores to the cells which are aligned in the direction perpendicular to the main direction as far from the cell of starting point (which is called a 'starting point cell').

For example, the cell C placed at the right bottom edge of the subarea RA2 shown in FIG. 13 is designated as a starting point cell SC and, a score is given to each cell. Since there are eleven cells C in the main direction of subarea RA shown in FIG. 13, a score '11' is given to the cells C arranged in the direction along the main direction from the starting point cell SC.

A score multiply increased based on the number of cells away from the start point SC is given to the cells C arranged along the vertical direction to the main direction from the starting point sell SC. For example, a score '22' is given to the cell C adjacent to the starting point cell SC with the score '11' in the above vertical direction. Further, a score '33' is given to the cell C two (2) cells away from the starting point cell SC, a score '44' is given to the cell C three cells away from the starting point cell SC, and a score '55' is given to the cell C four cells away from the starting point cell SC.

After scores are given to respective cells C at step S33, by extending the route from the starting point cell SC to respective cells C based on the predetermined rule, the partial traveling route generation unit 55*b* generates the route that passes through all cells C included in the subarea RA as the partial traveling route for paint-out travel at step S34.

For example, in order to determine the next cell to move sequentially from the start point cell SC, the partial traveling route generation unit 55*b* generates the route that passes through all cells C by extending the route to the cell C, which has not been included in the route, with the higher score adjacent to the present cell C in the main direction or in the vertical direction to the main direction. Hereinafter, generation of the route will be further described by using the example shown in FIG. 13.

For example, the score '11' is given to the starting point cell SC and the same score '11' is given to the cell C adjacent in the main direction. The higher score '22' is given to the cell C adjacent in the vertical direction to the main direction. In this case, since the partial traveling route generation unit 55*b* selects the cell C with the higher score '22' out of cells adjacent to the start point cell SC, the route extends in the direction vertical to the main direction.

When the route extending from the starting point cell SC by turns in the direction vertical to the main direction reaches the cell C with score '55' (the cell C at the right top edge of the subarea RA2 of FIG. 13), the partial traveling route generation unit 55*b* changes the route extending direction and extends the route from right to left along the main direction in the figure. Because, the cell C not being included in the route and with the higher score among the cells adjacent to the cell C (score '55') at the right top edge is the cell C (score '55') left adjacent to such cell C.

After the above route extending in the main direction reaches the cell C (score '55') at the left top edge of FIG. 13, the partial traveling route generation unit 55*b* changes the route extending direction and extends the route in the direction downwardly vertical to the main direction. Because, the cell C not being included in the route and with the higher score among the cells adjacent to the cell C (score '55') at the left top edge is the cell C (score '44') below adjacent to such cell C.

After the route extends to the cell below the cell C at the left top edge of FIG. 13, the partial traveling route generation unit 55*b* further changes the route extending direction, and extends the route to the cell C with score '44' from left to right along the main direction. In the same way thereafter, by extending the route to the adjacent cell C based on the above described rule, the partial traveling route generation unit 55*b* generates the route that passes through all cells C of the subarea RA 2 as shown in FIG. 14 as the partial traveling route that paints out the subarea RA2.

After the route that passes through all cells C is generated, the partial traveling route generation unit 55*b* arranges a plurality of the passing points (points shown in coordinate value) on the route, makes the partially traveling schedule 501*c* by associating the time to pass each passing point with the corresponding passing point, and records it in the partial traveling route data 501. In the partial traveling schedule 501*c* for paint-out travel, the starting point and the end point of boundary line (route PR2) of the subarea RA2 are the starting point and the end point of the partial traveling schedule 501*c*, respectively. For example, the starting point of boundary line (route PR2) of the subarea RA2 is the starting point of the partial traveling schedule 501*c* and the end point of boundary line (route PR2) of the subarea RA2 is the end point of the partial traveling schedule 501*c*.

By executing the above steps S31 to S34, the partial traveling route generation unit 55*b* can generate the partial traveling route data having the data structure as shown in FIG. 15. FIG. 15 shows an example of the data structure of the partial traveling route data for paint-out travel.

As shown in FIG. 15, the partial traveling schedule 501*c* of the partial traveling route data 501 for paint-out travel associates a plurality of times, a coordinate value (coordinate value of x-y coordinate) at each time, and an attitude angle θ with each other and records them.

The partial traveling route data 501 for paint-out travel shown in FIG. 15 includes the environmental map data 501*d*, which is not associated with each passing point of the partially traveling schedule 501*c*. Accordingly, in the partial traveling route data 501 for paint-out travel, the environmental map data 501*d* is associated with the partial traveling schedule 501*c*.

As described above, a plurality of the partial traveling route data 501 and the route connection data 502 are generated for the subareas separated each other included in the predetermined area A. Accordingly, a plurality of the partial traveling route data 501 and the route connection data 502 include individual environmental map reproducing data 501*b* (for copy travel, connection route) or the environmental map data 501*d* (for paint-out travel), respectively. In addition, each passing point of the traveling schedule included in the partial traveling route data 501 and the route connection data 502 is a coordinate point based on the self-position estimated by using the individual environmental map reproducing data 501*b* or environmental map data 501*d*. According to the present preferred embodiment, a plurality of the partial traveling route data 501 and the route connection data 502 are generated for the subarea including individual coordinate system, respectively.

Note that, when the partial traveling route for paint-out travel is generated in the subarea, the cleaning conditions desired to be set at each passing point of the partial traveling route for paint-out travel may be associated with the corresponding passing points (time) of the partial traveling schedule 501a and recorded by the partial traveling route generation unit 55b.

This enables the autonomously traveling vehicle 100 to perform autonomously the cleaning operation in the manner of painting out the subarea.

Next, with reference to FIG. 16, the creating operation of the autonomous travel route executed at step S2 of the flowchart shown in the above FIG. 4 will be described. FIG. 16 is a flowchart showing the creating operation of autonomous travel route. The autonomous travel route is created by selecting a plurality of the partial traveling routes desired to be traveled, searching the connection routes to connect the selected partial traveling routes, and associating a plurality of the partial traveling routes with the connection routes to create the autonomous traveling schedule 500.

First, at step S41, a user selects the partial traveling routes to cause the autonomously traveling vehicle 100 to travel autonomously.

In detail, the autonomous travel route plan generator 55c displays a user interface (referred to as selection user interface GUI8) as shown in FIG. 17 on the screen of the operation setting unit 9. FIG. 17 is a diagram showing an example of the selection user interface.

The selection user interface GUI8 is a user interface to select the desired one from partial traveling routes stored in the storage 57. The selection user interface GUI8 includes a route display D9, which displays a list of the name of the stored partial traveling routes, a starting position display D10, which displays map information around the starting point of the partial traveling route being selected, a switching button B9 to switch whether only partial traveling routes selected by the route display D9 are displayed in order of selection or all partial traveling routes are displayed, an enter button B10, which determines the selected partial traveling routes being selected, and a route selection display SE1 to provide a display area for selection of partial traveling routes.

On the screen of the route display D9 of the selection user interface GUI8, the partial traveling routes can be selected, for example, by pressing the route selection display SE1 in the manner of showing the name of desired partial traveling route within the reverse C-shaped selection area of the route selection display SE1.

After the partial traveling route is selected as described above, at Step S42, with reference to the connection information 503, the autonomous travel plan generator 55c searches the connection route such that connection destination is the currently selected partial traveling route and the connection source is the previously selected partial traveling route.

Note that, when no partial traveling route is selected prior to the selected partial traveling route at this time, the search of the connection route and judgment of existence of the connection route are not performed. The autonomous travel plan generator 55c incorporates the currently selected partial traveling route in the autonomous traveling schedule 500.

As a result of the search at step S42, when there is the connection route such that the currently selected partial traveling route is regarded as a connection destination and the previously selected partial traveling route is regarded as a connection source (select 'Yes' at step S43), the autonomous travel planning unit 55c associates the partial traveling route selected just before (partial traveling route data 501), the connection route found at the search (connection route data 502), and the partial traveling route (partial traveling route data 501) selected at this time with each other to create the autonomous traveling schedule 500 at step 44.

Specifically, the autonomous travel plan generator 55c, for example, as shown in FIG. 18, generates the autonomous traveling schedule 500 which lists identification data of the partial traveling route selected just before(e.g., the file name of the partial traveling route data 501), identification data of the connection route found at search (e.g., the file name of connection route data 502), and identification data of the partial traveling route selected at this time(e.g., the file name of the partial traveling route data 501) in order of autonomous travel. FIG. 18 shows an example of the autonomous traveling schedule.

When the connection route configured such that the partial traveling route selected at this time is a connection destination and the partial traveling route selected just before it is a connection source is found, the autonomous travel plan generator 55c, as shown in FIG. 19, adds a triangle sign next to the name of the partial traveling route selected at this time on the screen of the route display D9 of the selection user interface GUI8. As a result, it can be visually showed that the partial traveling route selected at this time is appreciated.

FIG. 19 shows an example of the selection user interface displaying the expression for identifying the selected partial traveling route.

When the route selection display SE1 is further pressed while the partial traveling route selected temporarily is shown within the reverse C-shaped display section of the route selection display SE1, the traveling route is unselected and deleted from the autonomous traveling schedule 500.

Moreover, when a plurality of the partial traveling routes are selected and one partial traveling route out of the plurality of the partial traveling routes is unselected or deleted, not only the partial traveling route but also the partial traveling route selected after the partial traveling route are unselected.

In addition, as shown in FIG. 20, the switch button B9 is pressed while all partial traveling routes are displayed on the screen of the route display D9 in the selection user interface GUI8, so that only the partial traveling routes selected to date may be displayed on the screen of the route display D9. When a plurality of partial traveling routes are selected, the names of these partial traveling routes are displayed on the screen of the route display D9 in order of selection. FIG. 20 shows an example of selection user interface displaying only selected partial traveling routes.

Whereas, the switch button B9 is pressed while only the partial travelling routes selected to date are displayed on the screen of the route display D9, so that, as shown in FIGS. 17 and 19, all partial traveling routes including the partial traveling routes that have not been selected are displayed on the screen of the route display D9.

Returning to FIG. 16, as a result of the search at step S42, when the partial traveling route selected at this time is a connection destination and the partial traveling route selected just before it is a connection source (selected 'No' at step S43), the autonomous travel plan generator 55c notifies the operation setting unit 9 of the absence of connection routes corresponding to the selected partial traveling routes at step S45.

The operation setting unit 9 (an example of notifier) which receives this information notifies a user of the error. Specifically, the selection user interface GUI8 displays information that the continuous autonomous travel route cannot be created with the selected partial traveling routes. Other than visual information, the above error may be notified with an alarm.

An error is notified when there is no connection route corresponding to at least a portion of the selected partial traveling routes. This allows users to know that the continuous autonomous travel route cannot be created with the selected partial traveling routes.

After the partial traveling routes are selected, the autonomous travel plan generator 55*c* determines at step S46 whether the selection of partial traveling route has been finished or not. For example, it can be determined that the selection has been finished by pressing the enter button B10 of the selection user interface GUI8.

When the selection of the partial traveling route has not been finished (select 'No' at step S46), the creating operation of the autonomous traveling schedule 500 returns to step S41 to continue the selection of partial traveling routes and creation of the autonomous traveling schedule 500.

When the selection of the partial traveling route has been finished (select 'Yes' at step S46), creation of the autonomous traveling schedule 500 is finished.

By implementing the above steps S41 to S46 to create the autonomous traveling schedule 500 (autonomous travel route), the autonomous travel plan generator 55*c* connects a plurality of partial traveling routes created on different coordinates respectively so as to create the autonomous traveling schedule 500 that allows for an autonomous travel in the large area where the map information cannot be created correctly by the data obtained from the forward sensor 21*a* and the backward sensor 21*b*.

A user interface displayed on the screen of the operation setting unit 9 while the autonomous traveling schedule 500 is created is not limited to the selection user interface GUI8 as shown in FIG. 17, 19, or 20.

For example, a user interface GUI9 showing all partial traveling routes stored in the storage 57 in the graphical manner as shown in FIG. 21A may be displayed on the screen of the operation setting unit 9. In this case, a user selects a graphic of the partial traveling route displayed on such user interface GUI9 (for example, touches the graphic of partial traveling route to be selected) so as to select the partial traveling route to be autonomously traveled on. FIG. 21A shows another example of a user interface displayed to select a partial traveling route.

Thus, the selectable partial traveling routes are displayed in the graphical manner, so that the selection of the partial traveling routes can be performed intuitively.

Triangle buttons are provided at the both sides of the graphics showing three partial traveling routes on the user interface GUI9 shown in FIG. 21A. By pressing these buttons, other partial traveling routes which are not shown at this time are displayed in the graphical manner, and the other partial traveling route can be selected.

As the substitute variation, for example, the user interface, which displays a list of file names of the partial traveling route data 501 stored in the storage 57 on the operation setting unit 9, is displayed on the screen of the operation setting unit 9 and a user selects (for example, touches the display portion of the file name), so that the partial traveling route with the selected file name can be selected.

When a partial traveling route is selected by use of the user interface GUI9 shown in FIG. 21A, for example, as shown in FIG. 21B, the order of selection of the partial traveling routes are displayed on the bottom left corner of each figure of the partial traveling routes.

For example, when the partial traveling route displayed 'C COURSE' is selected first, the partial route displayed 'A COURSE' is selected second, and the partial route displayed 'B COURSE' is selected third, '1' is displayed on the bottom left corner of the figure of the partial traveling route named 'C COURSE', '2' is displayed on the bottom left corner of the figure of the partial traveling route named 'A COURSE', and '3' is displayed on the bottom left corner of the figure of the partial traveling route named 'B COURSE'. FIG. 21B shows an example of display just after the partial traveling routes are selected.

Thereafter, when the selection of the partial traveling route has been finished by pressing the 'OK' button on the user interface GUI9, rearrangement situation figures of the partial traveling routes being displayed at present are displayed as an animation as shown in FIG. 21C, and the figures of the partial traveling routes are finally rearranged in order of selection (for example, from left to right) and redisplayed as shown in FIG. 21D. FIG. 21C is one example of an animation diagram showing the situation that the figures of the partial traveling routes are rearranged in order of selection. FIG. 21D is one example of a diagram just after partial traveling routes have been rearranged in order of selection.

As described above, the selection order of the partial traveling routes can be displayed in number and the partial traveling routes are rearranged and displayed, so that the order of selection of partial traveling routes can be confirmed intuitively.

With reference to FIG. 22, the autonomous traveling operation performed at step S3 of the flowchart shown in FIG. 4 after creation of the autonomous travel route will be described. FIG. 22 is a flowchart showing the autonomous traveling operation. The traveling reproduction unit 55*d* selects the partial traveling routes and the connection routes listed in the autonomous traveling schedule 500 in order, generates the reproductive traveling instruction for autonomous travel on the selected partial traveling route or the connection route, and outputs the instruction to the travelling controller 51 (and the cleaning controller 53), so that the autonomous traveling operation can be achieved.

After starting the autonomous travel, the central controller 55 displays the instruction for moving the autonomously traveling vehicle 100 to the starting point of the partial traveling route, which is determined to autonomously travel first, on the screen of the operation setting unit 9. A user checks the instruction and operates the teaching unit 7 to move the autonomously traveling vehicle 100 to the starting point of the first partial traveling route.

In this time, the central controller 55 may display on the screen of the operation setting unit 9 the information instructing which direction and a distance that the autonomously traveling vehicle 100 should be moved in order to reach the starting point of the first partial traveling route. This enables a user to operate the traveling route teaching unit 7 while checking the navigation information displayed on the setting device 9 to make sure to move the autonomously traveling vehicle 100 to the starting point described above.

While the autonomous travel vehicle 100 is moving by user operation of the traveling route teaching unit 7, the central controller 55 displays a user interface (referred to as a first autonomous travel user interface GUI10) as shown in FIG. 23A on the operation setting unit 9 when it is determined that the autonomously traveling vehicle 100 arrives at the starting point of the first partial traveling route. FIG. 23A shows an example of the first autonomous travel user interface.

The first autonomous travel user interface GUI10 is a user interface for instructing the start of autonomous travel, and includes a start button B11 to start an autonomous travel and a starting position display D11 to display the map information around the starting point of the first partial traveling route.

When the start button B11 on the first autonomous travel user interface GUI10 is pressed, a user interface is displayed as shown in FIG. 23B (referred to as a second autonomous travel user interface GUI11). FIG. 23B is a diagram showing an example of the second autonomous travel user interface.

The second autonomous travel user interface GUI11 is a user interface for displaying the condition of autonomous travel, and includes a time display D12 to display the time required for autonomous travel on all routes stored in the autonomous traveling schedule 500, a pause button B12 to stop an autonomous travel temporarily, and a stop button B13 to stop an autonomous travel.

When the start button B11 of the first autonomous travel user interface GUI10 is pressed and an autonomous travel starts, the traveling reproduction unit 55d selects the partial traveling route data 501 of the partial traveling route to be used for autonomous travel or the route connection data 502 of the connection route with reference to the autonomous traveling schedule 500 at step S52.

Thereafter, at step S53, the traveling reproduction unit 55d generates the reproductive traveling instruction for autonomous travel by using the partial traveling schedule 501a, 501c included in the selected partial traveling route data 501 or the traveling schedule included in the selected route connection data 502 and outputs the instruction to the travelling controller 51 (and the cleaning controller 53). As a result, the autonomously traveling vehicle 100 travels autonomously in accordance with the selected partial traveling schedule 501a, 501c or the traveling schedule of the connection route.

At step S53, the self-position estimation unit 55a estimates a self-position during autonomously traveling by using the environmental map reproducing data 501b or the environmental map 501d included in the selected partial traveling route data 501 or the environmental map reproducing data included in the selected connection route data 502 as the global map.

After the autonomously travel vehicle 100 reaches the end point of the currently selected partial traveling route or connection route, at step S54, with reference to the autonomous traveling schedule 500, the traveling reproduction unit 55d determines whether the partial traveling route or the connection route to be autonomously traveled next time exists or not.

When the partial traveling route or connection route to be autonomously traveled exists (select 'yes' at step S54), the autonomous traveling operation will return to step S52. In other words, the above steps S52 to S54 are executed repeatedly until any partial traveling route or any connection route to be autonomously traveled does not exist (until selecting 'No' at step S54).

The traveling reproduction unit 55d executes the above steps S51 to S54, which enables the autonomously traveling vehicle 100 to travel autonomously continuously on the partial traveling routes and the connection routes listed in the autonomous traveling schedule 500 in order (e.g., the determined order of autonomous traveling).

2. Second Preferred Embodiment

According to the above first preferred embodiment, the connection route is taught by a user, and the route connection data 502 is generated in the same way as the partial traveling routes for copy travel. However, generating methods of connection routes are not limited to the method by copy travel. For example, the autonomously traveling vehicle 200 according to a second preferred embodiment generates the connection route from a path planning.

Hereinafter, with reference to FIG. 24, a connection route generating method for the autonomously traveling vehicle 200 according to the second preferred embodiment will now be described. FIG. 24 is a flowchart showing the method of generating a connection route according to the second preferred embodiment. Note that, other than generating the connection route by the path planning in the second preferred embodiment, the configurations and functions of the autonomously traveling vehicle 200 according to the second preferred embodiment is the same as those of the autonomously traveling vehicle 100 according to the first preferred embodiment. Accordingly, the descriptions other than the method to generate the connection route are omitted herein. In addition, the operations in accordance with the flowchart shown in FIG. 24 are performed, similarly to the first preferred embodiment, by the partial traveling route generation unit 55b.

First, at step S61, the partial traveling route generation unit 55b obtains a global map for the connection route to be generated. For example, the partial traveling route generation unit 55b obtains a local map while the autonomously traveling vehicle 100 moves from a position as a starting point of the connection route (an end point of the partial traveling route of connection source) to a position as an end point (a starting point of the partial traveling route of connection destination) and arrange the local map on the corresponding position to generate the global map.

As a substitute preferred embodiment of the present invention, for example, the global map may be generated by creating the map information which shows the situation of the surrounding of the connection route with CAD or the like and converting the map information into the data.

Next, at step S62, using the generated global map, the partial traveling route generation unit 55b executes a path planning of the route connecting the starting point of connection (the end point of partial traveling route of the connection source) and the end point (the starting point of partial traveling route of the connection destination) to regard the route as the connection route.

The partial traveling route generation unit 55b, for example, either plans the shortest route between the starting point and the end point as the connection route, or creates the optimum route to prevent obstacles as the connection route when there are such obstacles between the starting point and the end point. Alternatively, at step S62, a plurality of the connection routes may be created. In this case, for example, in accordance with the selection by a user or the situation during autonomously traveling, the partial traveling route generation unit 55b can determine which the connection route connects the partial traveling routes.

After the connection route is created, at step S63, the partial traveling route generation unit 55b generates the route connection data 502 for the created connection route. Specifically, the partial traveling route generation unit 55b arranges a plurality of the passing points (point shown with coordinate value and attitude angle) on the created route, makes the connection route schedule 502a (FIG. 25) by associating the time for passing at each passing point with the corresponding passing point, and records it in the route connection data 502. The global map generated at the above step S61 is stored in the route connection data 502 as the environment map data 502b (FIG. 25).

By executing the above steps S61 to S63, the partial traveling route generation unit 55b can generate the route connection data 502 having a data structure, for example, as shown in FIG. 25. FIG. 25 is a diagram showing an example of a data structure of the connection route data generated in the second preferred embodiment of the present invention.

As shown in FIG. 25, the route connection data 502 generated in the second preferred embodiment has a data structure similar to one of the partial traveling route data 501 for the paint-out travel described in the above first preferred embodiment. Specifically, in the route connection data 502, the environment map data 502b is not associated with each passing point of the connection route schedule 502a.

As described above, the connection route can be generated also by using the methods other than the copy travel by user teaching.

3. Third Preferred Embodiment

According to the above first preferred embodiment and the second preferred embodiment, the partial traveling route and the connection route are alternately generated in order of the generation of the partial traveling route, generation of the connection route, and generation of the partial traveling route. This allows the partial traveling route and the connection route to be continuously generated. However, the order of generation of the partial traveling route and the connection route is not limited to this order.

In the autonomously traveling vehicle 300 according to the third preferred embodiment, after the necessary partial traveling routes are generated, the connection routes that connect these partial traveling routes are generated. Hereinafter, with reference to FIG. 26, a method of generating the partial traveling routes and the connection routes for the autonomously traveling vehicle 300 according to the third preferred embodiment will be described. FIG. 26 is a flowchart showing a method to generate the partial traveling routes and the connection routes according to the third preferred embodiment.

Note that, other than the order of generation of the partial traveling route and the connection route in the third preferred embodiment being different, the configurations and functions of the autonomously traveling vehicle 300 according to the third preferred embodiment are the same as those of the autonomously traveling vehicle 100 according to the first preferred embodiment and the autonomously traveling vehicle 200 according to the second preferred embodiment. Therefore, only description of the method to generate the partial traveling routes and the connection routes will be provided. Operations of the flowchart shown in FIG. 26 are performed by the partial traveling route generation unit 55b, similarly to the first preferred embodiment and the second preferred embodiment.

First, at step S71, the partial traveling route generation unit 55b generates all partial traveling routes to be generated in the predetermined area A. For example, for each subarea of the predetermined area A, either the operations to generate the partial traveling route for copy travel described in the first preferred embodiment (steps S21 to S26 of the flowchart shown in FIG. 8) or the operations to generate the partial traveling route for paint-out travel (steps S31 to S34 of the flowchart shown in FIG. 11) is performed, so as to generate the partial traveling route.

After all of the necessary partial traveling routes are generated, at step S72, the partial traveling route generation unit 55b generates the connection routes to connect these generated partial traveling routes. For example, the connection route is generated either by user teaching described in the first preferred embodiment or by the path planning (executing steps S61 to S63 of the flowchart shown in FIG. 24) described in the second preferred embodiment.

After generating the one connection route, at step S73, the partial traveling route generation unit 55b associates the partial traveling route of the connection source with the partial traveling route of the connection destination according to the generated connection route to generate the connection information 503.

After the above steps S72 and S73 are executed, when there are any connection routes required to be further generated (select 'No' at step S74), the generating operation of the partial traveling routes and the connection routes returns to step S72. On the other hand, when all connection routes required have been generated (select 'Yes' at step S74), generation of the partial traveling routes and the connection routes is finished.

Executing the above steps S71 to S74 allows the autonomous travel route (autonomous traveling schedule 500) to be further flexibly created. Specifically, with respect to the selected partial traveling routes, various patterns of autonomous travel routes can be generated.

For example, the partial traveling route generation unit 55b according to the third preferred embodiment generates the connection routes connected from each end point of the generated partial traveling route in all subareas to each starting point of all partial traveling routes in another subarea. The partial traveling route generation unit 55b capable of generating connection routes from one end point to a plurality of starting points can generate, for example, the autonomous travel route connecting the partial traveling route PR 1 and the partial traveling route PR 3 in addition to the connection route CR (1, 2) to the partial traveling route PR 2 shown in FIG. 5.

As described above, even if a user selects the partial traveling routes in any combination and any order during creating the autonomous travel route, the autonomously traveling vehicle 300 according to the third preferred embodiment can create an autonomous travel route in accordance with the user selection without any errors (e.g., no connection route exists and partial traveling routes cannot be connected).

4. Another Preferred Embodiment

As above, a plurality of the preferred embodiments of the present invention are described, however, the preferred embodiments of the present invention are not limited to the above preferred embodiments, and various changes may be made without departing from the scope of the present invention. Especially, a plurality of preferred embodiments and variations described in this description may be combined as desired.

For example, the first to third above-described preferred embodiments are able to be combined. In addition, the order and/or contents of operations at each step in each flowchart described in each preferred embodiment may be changed in an appropriate manner without departing from the scope of the present invention.

When an autonomous travel route is created, the partial traveling route for autonomous travel being first started is selected and the autonomously traveling vehicle 100 is moved to the starting point of the partial traveling route. Then, the connection route connecting the remaining partial traveling routes with them may be selected.

The generated partial traveling routes and connection routes may be individually set whether a cleaning operation is executed or not.

For example, when generating the partial traveling routes and the connection routes, the partial traveling route generation unit 55b can record cleaning conditions into the sub-route traveling data 501 and/or the route connection data 502 at places where a user actually performs cleaning operation. Thus, when the user performs the cleaning operation at the specific partial traveling routes and/or the connection routes, the partial traveling route generation unit 55b judges that the specific route has been set to perform the cleaning operation and records such cleaning conditions into a sub-route traveling data 501 and/or a route connection data 502. On the contrary, the partial traveling route generation unit 55b can judge that the partial traveling route and/or the connection route, which the user has not yet clean, has set not to be performed the cleaning operation.

Alternatively, for example, using the operation setting unit 9, a user may be able to set whether cleaning operations of each of the partial traveling route and connection route are performed or not.

In this case, for the partial traveling routes and/or connection routes which have been set that the cleaning operation is not performed, even if the cleaning operation is performed in the partial traveling route and/or the connection route when generating the partial traveling routes and/or the connection routes, the partial traveling route generation unit 55b does not record such cleaning conditions in the partial traveling route data 501 and/or the route connection data 502.

The connection route is not limited to the connection route that connects the partial traveling routes generated as described above. For example, the connection route can be generated from a charging station of a backyard to the partial traveling route. Alternatively, the connection route can be generated from the partial traveling route to the charging station of a backyard. Further, the connection route can be generated from the specific position of the predetermined area A (for example, a common starting point of autonomous traveling) to the partial traveling route.

Therefore, for example, it can be realized that both the autonomous traveling on the partial traveling route (and cleaning operation) starts after charging a battery (not shown) of the autonomously traveling vehicle 100 at a charging station, and the autonomously traveling is performed to autonomously move to the charging station and start charging the battery when the remaining battery becomes low while autonomously traveling on the partial traveling route. Moreover, for example, even if any partial traveling route is selected, the autonomous traveling is able to start from any starting position.

A method of generating the connection route is not limited to the method to generate while moving the autonomously traveling vehicle 100 in a manual mode. For example, the end point of a certain partial traveling route and the starting point of the next partial traveling route are matched without moving the autonomously traveling vehicle 100, and without generating the connection route, the autonomously traveling vehicle 100 may start the next partial travel immediately after finishing autonomous travel of a partial travel.

According to the above first preferred embodiment to third preferred embodiment, the autonomously travel routes (autonomous traveling schedule 500) in which all selected partial traveling routes are connected with the connection routes are generated. However, the autonomous travel plan generator 55c may create the autonomous travel route by connecting a selected partial traveling route with a connection route every time.

For example, by connecting the partial traveling route for n-th autonomously travel with the partial traveling route for n+1-th autonomously travel, the autonomous traveling schedule 500 is generated, and then the autonomous traveling starts. After autonomous traveling of the n+1-th partial traveling route has finished, a new autonomous traveling schedule 500 is generated by connecting the partial traveling route for n+1-th autonomously travel with the partial traveling route for n+2-th autonomously travel and then the autonomous traveling starts. These operations can also be repeatedly performed to create the autonomous travel route.

When selecting the partial traveling route at step S41 in generating operations of the autonomous travel route shown in FIG. 16, a user may set the order of the partial traveling routes to be traveled on by the autonomously traveling vehicle 100. In this case, after selecting the partial traveling route, the autonomous travel plan generator 55c may determine that the autonomously traveling vehicle 100 will autonomously travel on the partial traveling route in the order set by the user.

In addition, when selecting the partial traveling route at step S41 in the generating operation of the autonomous travel route shown in FIG. 16, a user may determine whether the partial traveling route is connected or not. Therefore, when the starting point and end point of the partial traveling route are the same, the autonomously traveling vehicle user may skip the traveling operation on the partial traveling route and move to the following connection traveling by a user's judgment. For example, when a predetermined area has been cleaned manually, this prevents the area from being cleaned twice.

In performing the generating operation of the autonomous travel route shown in FIG. 16, the autonomous travel plan generator 55c may determine automatically the optimum order of autonomous traveling for the partial traveling routes selected by a user at step S41. For example, autonomous travel plan generator 55c may determine the order that allows the autonomously traveling vehicle 100 to travel autonomously on all the partial traveling routes in the shortest way using the path planning. For example, this enables generation of a more optimum autonomous travel route than that selected by a user. For example, the autonomous travel route that allows the autonomously traveling vehicle to complete autonomous traveling in a shorter time than the autonomous travel route selected by a user can be generated.

When the partial traveling routes are selected in an inappropriate combination and/or order, the autonomous travel plan generator 55c may lead a user to reselect the partial traveling route instead of suspending the generation of the autonomous travel route by notifying error.

If the partial traveling routes are selected in an inappropriate combination and/or order, or if there is any connectable partial traveling route in those selected, the autonomous travel plan generator 55c may generate the autonomous travel route by connecting the connectable partial traveling routes.

In this case, for example, the autonomous travel route plan generator 55c may generate the autonomous travel route from the partial traveling route to be first traveled to the connectable partial traveling route. Alternatively, the autonomous travel plan generator 55c may generate the autonomous travel route by connecting the connectable partial traveling routes and skip the partial traveling route that cannot be connected (remove from the autonomous travel route), and then connect another connectable partial traveling route so as to generate the autonomous travel route.

At step S41, the partial traveling route for the autonomous travel generated by the autonomous travel plan generator 55c may be added to the partial traveling route for another autonomous travel selected by a user. In this case, for example, the autonomous travel plan generator 55c may determine that the autonomous travel starts from a specific partial traveling route regardless of whether the specific partial traveling route is included or not in the partial traveling route selected by the user. The autonomous travel plan generator 55c may determine, for example, that a highest priority partial traveling route is to be traveled first.

The traveling reproduction unit 55d may lead the vehicle to travel autonomously on the route corresponding to the specific time (e.g., a specific time has passed from the start of the autonomous traveling) for each of the partial traveling routes and connection routes included in the autonomous travel route (autonomous traveling schedule 500). In this case, for example, in order to generate autonomous traveling schedule 500, the autonomous travel plan generator 55c may associate each of identification information of partial traveling routes and the connection routes with the starting time of the autonomous traveling of the corresponding route, and may record them.

The autonomous travel plan generator 55c may generate the autonomous traveling schedule 500 by connecting the traveling schedules 501a, 501c of the selected partial traveling routes and the traveling schedule of the connection route with each other. Thus, the autonomous traveling schedule 500 associating a plurality of passing points (coordinate value) with the time for passing through each passing point, may be generated.

In this case, in the autonomous traveling schedule 500, the information (for example, a flag) showing that global map used for a self-position estimation is switched may be incorporated in the connecting section of the partial traveling schedules 501a, 501c and the traveling schedule of the connection route. This allows the timing to switch the global map used for self-position estimation to be known in the autonomous traveling schedule 500 associating the time and passing point with each other.

As the partial traveling route data 501 of the partial traveling route for painting out and the route connection data 502 of the connection route by path planning, the traveling schedule in the partial traveling route data 501 for copy travel and/or the route connection data 502 of the connection route by user teaching, may be associated with one environmental map data (global map).

The preferred embodiments of present invention are widely applicable to autonomously traveling vehicles that travel autonomously on an autonomous travel route.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An autonomously traveling vehicle to autonomously travel on a designated route in a predetermined area, the autonomously traveling vehicle comprising:
   a main body including a travel carriage;
   a storage to store partial traveling route data and connection route data, the partial traveling route data representing partial traveling routes generated for each of subareas included in the predetermined area and includes an individual coordinate system, and the connection route data representing connection routes connecting the partial traveling routes;
   an autonomous travel plan generator to generate an autonomous traveling schedule for an autonomous travel by associating a plurality of the partial traveling route data representing selected partial traveling routes with the connection route data representing the connection routes selected to connect the selected partial traveling routes; and
   a traveling controller to move the main body by controlling the travel carriage based on the autonomous traveling schedule; wherein
   the partial traveling route data includes a partial traveling schedule and map information; and
   the partial traveling schedule representing a plurality of fixed passing points set on the partial traveling route as coordinate values of the individual coordinate system of the subarea, for which the partial traveling route is generated, includes the map information representing the subarea for which the partial traveling route is generated.

2. The autonomously traveling vehicle according to claim 1, wherein
   the storage is configured to store connection information in which the connection routes and the partial traveling routes to be connected by the connection routes are associated with each other and recorded; and
   the autonomous travel plan generator is configured to select the connection routes data to connect the selected partial traveling routes data based on the connection information.

3. The autonomously traveling vehicle according to claim 1, wherein the connection route data includes map information showing a status of surroundings of the connection route in the predetermined area.

4. The autonomously traveling vehicle according to claim 3, wherein the map information includes reproduction map information showing surroundings of each passing point of the connection route.

5. The autonomously traveling vehicle according to claim 1, further comprising an error notifier to provide notification of an error that a continuous autonomous travel route cannot be generated with the selected partial traveling routes when there is no connection route corresponding to at least a portion of the selected partial traveling routes.

6. A method of controlling an autonomously traveling vehicle that is provided with a main body including a traveling carriage and autonomously travels on a designated route in a predetermined area, the method comprising:
   generating partial traveling representing partial traveling routes for each of subareas included in the predetermined area and includes an individual coordinate system;
   generating connection route data representing connection routes connecting the partial traveling routes;

generating an autonomous traveling schedule for an autonomous travel by associating a plurality of the partial traveling route data representing selected partial traveling routes with the connection route data representing the connection routes selected to connect the selected partial traveling routes; and moving the main body by controlling the travel carriage in accordance with the autonomous traveling schedule; wherein the partial traveling route data includes a partial traveling schedule and map information; and the partial traveling schedule representing a plurality of fixed passing points set on the partial traveling route as coordinate values of the individual coordinate system of the subarea, for which the partial traveling route is generated, includes the map information representing the subarea for which the partial traveling route is generated.

7. A non-transitory computer-readable medium including a program executable to cause a computer to perform the method according to claim 6.

\* \* \* \* \*